(12) United States Patent
Howell et al.

(10) Patent No.: US 6,483,837 B1
(45) Date of Patent: Nov. 19, 2002

(54) SYSTEM AND METHOD FOR CONNECTING A CALL WITH AN INTERWORKING SYSTEM

(75) Inventors: Royal Dean Howell, Trimble, MO (US); William Lyle Wiley, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 09/027,008

(22) Filed: Feb. 20, 1998

(51) Int. Cl.[7] .................................................. H04J 3/16
(52) U.S. Cl. ..................... 370/395.3; 370/465; 370/466
(58) Field of Search .................................. 370/395, 352, 370/356, 358, 392, 396, 397, 401, 398, 376, 410, 467, 437, 399, 400, 402, 524, 426, 525, 526, 522; 710/31

(56) References Cited

U.S. PATENT DOCUMENTS

| | | |
|---|---|---|
| 4,201,889 A | 5/1980 | Lawrence et al. |
| 4,310,727 A | 1/1982 | Lawser |
| 4,348,554 A | 9/1982 | Asmuth |
| 4,453,247 A | 6/1984 | Suzuki et al. |
| 4,554,659 A | 11/1985 | Blood et al. |
| 4,565,903 A | 1/1986 | Riley |
| 4,683,563 A | 7/1987 | Rouse et al. |
| 4,720,850 A | 1/1988 | Oberlander |
| 4,730,312 A | 3/1988 | Johnson |
| 4,736,364 A | 4/1988 | Basso et al. |

(List continued on next page.)

FOREIGN PATENT DOCUMENTS

| | | | | |
|---|---|---|---|---|
| WO | WO-98/23053 A1 | * | 5/1998 | ............. H04J/3/12 |

OTHER PUBLICATIONS

U.S. patent application Ser. No. 09/082,165, filed May 20, 1998.
U.S. patent application Ser. No. 09/082,040, filed May 20, 1998.
U.S. patent application Ser. No. 09/082, 045, filed May 20, 1998.
U.S. patent application Ser. No. 09/082,048, filed May 20, 1998.
U.S. patent application Ser. No. 09/082,049, filed May 20, 1998.
U.S. patent application Ser. No. 09/082,393, filed May 20, 1998.

(List continued on next page.)

Primary Examiner—Dang Ton
Assistant Examiner—Ricardo M. Pizarro
(74) Attorney, Agent, or Firm—Harley R. Ball; Steven J. Funk; Kevin D. Robb

(57) ABSTRACT

An interworking system and method connects calls through the use of an asynchronous transfer mode (ATM) switch and interworking units. The ATM switch and interworking units may either be controlled by a signaling processor or not controlled by the signaling processor for particular calls to make connections. In some instances the signaling processor processes call signaling to determine connections for calls and transports control messages to the ATM switch and the interworking unit identifying the connections. The interworking unit interworks user communications from time division multiplex (TDM) formats to ATM for the selected ATM connections, and the ATM switch cross connects the user communications for the other selected ATM connections. In other instances, either of the ATM switch or the interworking unit may automatically cross connect or interwork the user connections to a connection without receiving a control message from the signaling processor that identifies the connection.

20 Claims, 10 Drawing Sheets

U.S. PATENT DOCUMENTS

| | | |
|---|---|---|
| 4,748,658 A | 5/1988 | Gopal |
| 4,823,338 A | 4/1989 | Chan et al. |
| 4,853,955 A | 8/1989 | Thorn et al. |
| 4,896,319 A | 1/1990 | Lidinsky et al. |
| 4,916,690 A | 4/1990 | Barri |
| 4,926,416 A | 5/1990 | Weik |
| 4,985,889 A | 1/1991 | Frankish et al. |
| 4,991,204 A | 2/1991 | Yamamoto et al. |
| 4,993,104 A | 2/1991 | Gordon |
| 5,003,584 A | 3/1991 | Benyacar |
| 5,018,191 A | 5/1991 | Catron et al. |
| 5,048,081 A | 9/1991 | Gavaras |
| 5,058,104 A | 10/1991 | Yonehara et al. |
| 5,067,123 A | 11/1991 | Hyodo et al. |
| 5,084,867 A | 1/1992 | Tachibana et al. |
| 5,089,954 A | 2/1992 | Rago |
| 5,091,903 A | 2/1992 | Schrodi |
| 5,101,404 A | 3/1992 | Kunimoto et al. |
| 5,115,431 A | 5/1992 | Williams et al. |
| 5,163,057 A | 11/1992 | Grupp |
| 5,168,492 A | 12/1992 | Beshai et al. |
| 5,185,743 A | 2/1993 | Murayama |
| 5,193,110 A | 3/1993 | Jones et al. |
| 5,204,857 A | 4/1993 | Obara |
| 5,216,669 A | 6/1993 | Hofstetter et al. |
| 5,218,602 A | 6/1993 | Grant et al. |
| 5,231,631 A | 7/1993 | Buhrke et al. |
| 5,231,633 A | 7/1993 | Hluchyi et al. |
| 5,233,607 A | 8/1993 | Barwig et al. |
| 5,239,539 A | 8/1993 | Uchida et al. |
| 5,249,178 A | 9/1993 | Kurano et al. |
| 5,251,255 A | 10/1993 | Epley |
| 5,253,247 A | 10/1993 | Hirose et al. |
| 5,255,266 A | 10/1993 | Watanabe et al. |
| 5,258,752 A | 11/1993 | Fukaya et al. |
| 5,258,979 A | 11/1993 | Oomuro et al. |
| 5,268,895 A | 12/1993 | Topper |
| 5,271,010 A | 12/1993 | Miyake |
| 5,274,680 A | 12/1993 | Sorton et al. |
| 5,278,889 A | 1/1994 | Papanicolaou et al. |
| 5,282,244 A | 1/1994 | Fuller et al. |
| 5,285,441 A | 2/1994 | Bansal et al. |
| 5,291,479 A | 3/1994 | Vaziri et al. |
| 5,306,318 A | 4/1994 | Bachhuber et al. |
| 5,311,509 A | 5/1994 | Heddes et al. |
| 5,317,562 A | 5/1994 | Nardin et al. |
| 5,323,389 A | 6/1994 | Bitz et al. |
| 5,327,421 A | 7/1994 | Hiller et al. |
| 5,327,433 A | 7/1994 | Hall |
| 5,329,308 A | 7/1994 | Binns et al. |
| 5,339,318 A | 8/1994 | Tanaka |
| 5,345,443 A | 9/1994 | D'Ambrogio et al. |
| 5,345,445 A | 9/1994 | Hiller |
| 5,345,446 A | 9/1994 | Hiller |
| 5,357,510 A | 10/1994 | Norizuki et al. |
| 5,363,433 A | 11/1994 | Isono |
| 5,365,524 A | 11/1994 | Hiller, et al. |
| 5,367,566 A | 11/1994 | Moe et al. |
| 5,373,504 A | 12/1994 | Tanaka et al. |
| 5,375,124 A | 12/1994 | D'Ambrogio |
| 5,377,186 A * | 12/1994 | Wegner et al. ............... 370/220 |
| 5,384,771 A | 1/1995 | Isidoro et al. |
| 5,384,840 A | 1/1995 | Blatchford et al. |
| 5,392,402 A | 2/1995 | Robrock |
| 5,394,393 A | 2/1995 | Brisson et al. |
| 5,394,398 A | 2/1995 | Rau |
| 5,414,701 A | 5/1995 | Shtayer et al. |
| 5,418,783 A | 5/1995 | Yamaki et al. |
| 5,420,857 A | 5/1995 | Jurkevich |
| 5,420,858 A | 5/1995 | Marshall et al. |
| 5,420,916 A | 5/1995 | Sekiguchi |
| 5,422,882 A | 6/1995 | Hiller |
| 5,425,090 A | 6/1995 | Orriss |
| 5,426,636 A | 6/1995 | Hiller et al. |
| 5,428,607 A | 6/1995 | Hiller et al. |
| 5,428,609 A | 6/1995 | Eng et al. |
| 5,434,852 A | 7/1995 | LaPorta |
| 5,434,981 A | 7/1995 | Lenihan et al. |
| 5,440,563 A | 8/1995 | Isidoro et al. |
| 5,444,713 A | 8/1995 | Backaus et al. |
| 5,446,738 A | 8/1995 | Kim et al. |
| 5,452,296 A | 9/1995 | Shimizu |
| 5,452,297 A | 9/1995 | Hiller et al. |
| 5,453,981 A | 9/1995 | Katsube et al. |
| 5,454,034 A | 9/1995 | Martin |
| 5,457,684 A | 10/1995 | Bharucha |
| 5,463,620 A | 10/1995 | Sriram |
| 5,463,621 A | 10/1995 | Suzuki |
| 5,473,677 A | 12/1995 | D'Amato |
| 5,473,679 A | 12/1995 | LaPorta |
| 5,477,537 A | 12/1995 | Dankert et al. |
| 5,479,401 A | 12/1995 | Bitz et al. |
| 5,479,402 A | 12/1995 | Hata et al. |
| 5,479,495 A | 12/1995 | Blumhardt |
| 5,483,527 A | 1/1996 | Doshi |
| 5,485,455 A | 1/1996 | Dobbins et al. |
| 5,495,484 A | 2/1996 | Self et al. |
| 5,497,373 A | 3/1996 | Hulen et al. |
| 5,504,742 A | 4/1996 | Kakuma et al. |
| 5,506,844 A | 4/1996 | Rao |
| 5,509,010 A | 4/1996 | LaPorta |
| 5,509,123 A | 4/1996 | Dobbins et al. |
| 5,513,178 A | 4/1996 | Tanaka |
| 5,519,707 A | 5/1996 | Subramanian et al. |
| 5,521,910 A | 5/1996 | Matthews |
| 5,522,042 A | 5/1996 | Fee et al. |
| 5,526,414 A | 6/1996 | Bedard et al. |
| 5,530,724 A | 6/1996 | Abrams et al. |
| 5,533,106 A | 7/1996 | Blumhardt |
| 5,539,698 A | 7/1996 | Kozaki et al. |
| 5,539,815 A | 7/1996 | Samba |
| 5,539,816 A | 7/1996 | Pinard et al. |
| 5,539,884 A | 7/1996 | Robrock |
| 5,541,918 A | 7/1996 | Ganmukhi et al. |
| 5,541,926 A | 7/1996 | Saito et al. |
| 5,544,152 A | 8/1996 | Obermanns et al. |
| 5,544,161 A | 8/1996 | Bigham et al. |
| 5,548,580 A | 8/1996 | Buckland |
| 5,550,819 A | 8/1996 | Duault |
| 5,550,914 A | 8/1996 | Clarke et al. |
| 5,563,939 A | 10/1996 | La Porta et al. |
| 5,566,173 A | 10/1996 | Steinbrecher |
| 5,568,475 A | 10/1996 | Doshi |
| 5,570,368 A | 10/1996 | Murakami et al. |
| 5,572,583 A | 11/1996 | Wheeler, Jr. et al. |
| 5,577,039 A | 11/1996 | Won et al. |
| 5,579,311 A | 11/1996 | Chopping et al. |
| 5,587,999 A | 12/1996 | Endo |
| 5,592,477 A | 1/1997 | Farris et al. |
| 5,600,640 A | 2/1997 | Blair et al. |
| 5,600,643 A | 2/1997 | Robrock |
| 5,627,836 A | 5/1997 | Conoscenti et al. |
| 5,629,930 A | 5/1997 | Beshai et al. |
| 5,635,980 A | 6/1997 | Lin et al. |
| 5,636,210 A | 6/1997 | Agrawal et al. |
| 5,640,446 A | 6/1997 | Everett et al. |
| 5,661,725 A | 8/1997 | Buck |
| 5,666,349 A | 9/1997 | Petri |
| 5,673,262 A | 9/1997 | Shimizu |
| 5,680,390 A | 10/1997 | Robrock |
| 5,689,550 A | 11/1997 | Garson et al. |

| | | | |
|---|---|---|---|
| 5,703,876 A | | 12/1997 | Christie |
| 5,708,702 A | | 1/1998 | DePaul et al. |
| 5,710,769 A | | 1/1998 | Anderson et al. |
| 5,719,863 A | | 2/1998 | Hummel |
| 5,745,553 A | | 4/1998 | Mirville |
| 5,751,706 A | | 5/1998 | Land |
| 5,793,845 A | | 8/1998 | Hollywood et al. |
| 5,920,562 A | * | 7/1999 | Christie et al. ............. 370/395 |
| 5,940,393 A | | 8/1999 | Duree et al. |
| 5,940,491 A | | 8/1999 | Anderson et al. |
| 5,991,301 A | | 11/1999 | Christie |
| 6,002,689 A | * | 12/1999 | Christie ...................... 370/401 |
| 6,014,378 A | * | 1/2000 | Christie ...................... 370/356 |
| 6,016,343 A | | 1/2000 | Hogan et al. |
| 6,031,840 A | * | 2/2000 | Christie et al. ............. 370/410 |
| 6,067,299 A | * | 5/2000 | Duree et al. ................ 370/397 |
| 6,081,525 A | * | 6/2000 | Christie ...................... 370/392 |
| 6,115,380 A | * | 9/2000 | Christie ...................... 370/395 |
| 6,137,800 A | * | 10/2000 | Wilesy ....................... 370/396 |
| 6,151,390 A | * | 11/2000 | Volftsun et al. ............ 379/229 |
| 6,178,170 B1 | * | 1/2001 | Duree ......................... 370/395 |
| 6,262,992 B1 | * | 7/2001 | Nelson ....................... 370/426 |
| 6,272,142 B1 | * | 8/2001 | Christie ...................... 370/410 |
| 6,304,572 B1 | * | 10/2001 | Christie ...................... 370/400 |
| 6,314,103 B1 | * | 11/2001 | Medhat |

OTHER PUBLICATIONS

U.S. patent application Ser. No. 09/081,166, filed May 20, 1998.

U.S. patent application Ser. No. 09/081,900, filed May 20, 1998.

U.S. patent application Ser. No. 09/081,891, filed May 20, 1998.

U.S. patent application Ser. No. 09/082,181, filed May 20, 1998.

U.S. patent application Ser. No. 09/082,182, filed May 20, 1998.

U.S. patent application Ser. No. 09/082,344, filed May 20, 1998.

U.S. patent application Ser. No. 09/082,180, filed May 20, 1998.

U.S. patent application Ser. No. 09/525,868, filed Sep. 8, 1995.

U.S. patent application Ser. No. 09/116,868, filed Jul. 16, 1998.

U.S. patent application Ser. No. 09/116,966, filed Jul. 16, 1998.

U.S. patent application Ser. No. 08/525,897, filed Sep. 8, 1995.

U.S. patent application Ser. No. 08/525,050, filed Sep. 8, 1995.

U.S. patent application Ser. No. 08/933,297, filed Sep. 19, 1997.

U.S. patent application Ser. No. 08/855,621, filed May 13, 1997.

U.S. patent application Ser. No. 08/594,661, filed Feb. 2, 1996.

U.S. patent application Ser. No. 08/594,660, filed Feb. 2, 1996.

U.S. patent application Ser. No. 08/594,662, filed Feb. 2, 1996.

U.S. patent application Ser. No. 08/754,847, filed Nov. 22, 1996.

U.S. patent application Ser. No. 08/754,849, filed Nov. 22, 1996.

U.S. patent application Ser. No. 08/755,268, filed Nov. 22, 1996.

U.S. patent application Ser. No. 08/755,438, filed Nov. 22, 1996.

U.S. patent application Ser. No. 08/653,852, filed May 28, 1996.

U.S. patent application Ser. No. 09/118,604, filed Jul. 17, 1998.

U.S. patent application Ser. No. 08/754,846, filed Nov. 22, 1996.

U.S. patent application Ser. No. 09/080,393, filed May 18, 1998.

U.S. patent application Ser. No. 08/755,523, filed Nov. 22, 1996.

U.S. patent application Ser. No. 08/853,843, filed May 9, 1997.

U.S. patent application Ser. No. 08/754,354, filed Nov. 22, 1996.

U.S. patent application Ser. No. 08/754,349, filed Nov. 22, 1996.

U.S. patent application Ser. No. 08/854,194, filed May 9, 1997.

U.S. patent application Ser. No. 08/921,874, filed Sep. 2, 1997.

U.S. patent application Ser. No. 09/026,872, filed Feb. 20, 1998.

U.S. patent application Ser. No. 08/840,317, filed Apr. 16, 1997.

U.S. patent application Ser. No. 09/027,416, filed Feb. 20, 1998.

U.S. patent application Ser. No. 08/922,196, filed Sep. 2, 1997.

U.S. patent application Ser. No. 08/923,762, filed Sep. 2, 1997.

U.S. patent application Ser. No. 09/026,906, filed Feb. 20, 1998.

U.S. patent application Ser. No. 09/027,022, filed Feb. 20, 1998.

U.S. patent application Ser. No. 09/026,766, filed Feb. 20, 1998.

U.S. patent application Ser. No. 09/058,642, filed Apr. 10, 1998.

ANSI–TI.111–1992, American National Standard for Telecommunications, "Signaling System No. 7 (SS7)—Message Transfer Part (MTP)," New York, NY.

ANSI–TI.112–1992, American National Standard for Telecommunications, "Signaling System No. 7 (SS7)—Signaling Connection Control Part (SCCP)," New York, NY.

ANSI–TI.113–1992, American National Standard for Telecommunications, "Signaling System No. 7 (SS7)—Integrated Services Digital Network (ISDN) User Part," New York, NY.

ANSI–TI.113a–1993, American National Standard for Telecommunications, "Signaling System No. 7 (SS7)—Integrated Services Digital Network (ISDN) User Part (Nxdso Multi–Rate Connection)," Washington, D.C.

ANSI–TI.113–1995, American National Standard for Telecommunications, "Signaling System No. 7 (SS7)—Integrated Services Digital Network (ISDN) User Part," New York, NY.

Shenoda et al., "A Method For Dynamic Bandwidth Allocation For Voice Trunking Using CES With CAS," ATM Forum Technical Committee 96–0136, Feb. 5, 1996.

McDysan, David E. and Spohn, Darren L., ATM Theory And Application, 1994, p. 256: 9.3.1; ATM Layer VPI/VCI Level Addressing.

Choi, Requirements For ATM Trunking, ATM Forum Technical Committee 95–1401, Oct. 2–6, 1995.

Stodola "Circuit Emulation Services Version 2 Baseline," ATM Forum Technical Committee 95–1504, Dec. 11–15, 1995.

Okutani et. al. "VTOA: Reference Configuration—ATM Trunking For Narrowband Services," ATM Forum Technical Committee 95–1364, Oct. 2–6, 1995.

Ohta, S., et al., A Dynamically Controllable ATM Transport Network Based On The Virtual Path Concept, Pp. 1272–1276, Communications For The Information Age, Globecom '88, Conference Record, vol. III, Nov. 28–Dec. 1, 1988.

Duault, Proposal For ATM Trunking Options, ATM Forum Technical Committee, 95–1230, Oct. 2–6, 1995.

Schink, "CES As A Flexible Trunking Method", ATM Forum Technical Committee 95–1157, Oct. 2–6, 1995.

Caves, Proposed modifications to the baseline text (95–0446R2) of the "VTOA—ATM Trunking for Narrowband Services" SPECIFICATION, ATM Forum Technical Committee 95–1134, Oct. 2–6, 1995.

Kumar, "SAA/VTOA Legacy Voice Service At A Native ATM Terminal", ATM Forum Technical Committee 95–0917R1, Oct. 2–6, 1995.

Duault, "Baseline Text For Voice And Telephony Over ATM–ATM Trunking For Narrowband Services", ATM Forum Technical Committee 95–0446R3, Oct. 2–6, 1995.

Stodola, "DS3/E3 Circuit Emulation—*Baseline* Proposed Text", ATM Forum Technical Committee 95–0278R1, Oct. 2–6, 1995.

Caves, Proposed modifications to the baseline text (95–0446R2) of the "VTOA—ATM Trunking For Narrowband Services Specification", ATM Forum Technical Committee 95–1134, Oct. 2–6, 1995.

Chiang, "Proposed Changes To Proxy Signaling Capability", ATM Forum Signaling Working Group 95–0046, Feb. 6–10, 1995.

Amin–Salehi, "Third Party Call Setup For a Video–On–Demand Connection Establishment", ATM Forum Technical Committee 95–0022, Feb. 5–8, 1995.

"ATM At A Glance," Transmission Technologies Access Guide, pp. 40–42, 1993.

Andrews, F., "Switching In A Competitive Market," IEEE Communications Magazine, Jan. 91.

Atoui, M., "Virtual Private Network Call Processing In The Intelligent Network," pp. 561–565, Chicago, IL, International Conference on Communications, vol. II., 1992.

Bosco, P., et al., "A Laboratory For AIN Service Design And Validation," pp. 566–571, Chicago, International Conference on Communications, vol. II, Jun. 14, 1992.

Cooper, C., et al., "Toward A Broadband Congestion Control Strategy," IEEE Network, The Magazine of Computer Communications, May 1990.

Fujioka, M., et al., "Universal Service Creation And Provision Environment For Intelligent Network," IEEE Communications Magazine, Jan. 1991.

Garrahan, J.J., et al., "Intelligent Network Overview," pp. 30–36, IEEE Communications Magazine, Mar. 1993.

Homa, J., et al., "Intelligent Network Requirements For Personal Communications Services," pp. 70–76, IEEE Communications Magazine, Feb. 1992.

Johnson, M. A., et al., "New Service Testing Functions For Advanced Intelligent Networks," pp. 709–720, 1992, Memphis, TN, IEEE 1992 Network Operations and Management Symposium, vol. III, Apr. 6, 1992.

Minzer, Steven, A Signaling Protocol For Complex Multimedia Services, pp. 1383–1394, IEEE Journal on Selected Areas in Communications vol. 9, No. 9 (ISSN 0733–8716).

Pinkham, G., et al. The Ericsson Approach To Intelligent Networks, pp. 320–324, Hollywood, FL, IEEE Global Telecommunications Conference & Exhibition, Session 10, paragraph 4, vol. I, 1988.

Woodworth, Clark B., et al., "A Flexible Broadband Packet Switch For A Multimedia Integrated Network," pp. 3.2.1–3.2.8, International Conference on Communications, Denver, ICC–91, Jun. 1991.

Yeh, S.Y., et al., The Evolving Intelligent Network Architecture, pp. 835–839, 1990, Hong Kong, IEEE Conference on Computer and Communication Systems.

"IN/B–ISDN Signaling Three Ways Of Integration," Study Group 11, Geneva, ITU—Telecommunication Standardization Sector, Nov. 29–Dec. 17, 1993.

"Interworking B–ISUP and Q.93B for DDI, MSN, TP and SUB," Study Group 11, Geneva, ITU—Telecommunication Standardization Sector, Nov. 29–Dec. 17, 1993.

"Q.2931, Clause 4—Information Elements," Geneva, ITU—Telecommunication Standardization Sector, Nov. 29–Dec. 17, 1993.

"Section 5 Of Q.93B," Study Group 11, Geneva, ITU—Telecommunication Standardization Sector, Nov. 29–Dec. 17, 1993.

"Chapter 6 Of Recommendation Q.93B," Study Group 11, Geneva, ITU—Telecommunication Standardization Sector, Nov. 29–Dec. 17, 1993.

"Clauses 7 And 8 Of Q.2931," Study Group 11, ITU—Telecommunication Standardization Sector, Dec. 1993.

"Revised Q.2931 User Side SDL Diagrams," Study Group 11, ITU—Telecommunication Standardization Sector, Nov. 29–Dec. 17, 1993.

"Annex E Of Recommendation Q.93B," Study Group 11, ITU—Telecommunication Standardization Sector, Nov. 29–Dec. 17, 1993.

"Annex J Of Q.2931, "Study Group 11, ITU—Telecommunication Standardization Sector, Dec. 1993.

"Appendix 1/Q.2931: Guidelines For The Use Of Instruction Indicators," Study Group 11, ITU—Telecommunication Standardization Sector, Nov. 29–Dec. 17, 1993.

"Draft Text For Q.2931: Appendix II (Information Items Required For Connection Establishment And Routing In B–ISDN)," Study Group 11, ITU—Telecommunication Standardization Sector.

General Recommendations On Telephone Switching And Signaling Intelligent Network–Intelligent Network Physical Plane Architecture Q.1205, ITU–T Recommendation, Telecommunication Standardization Sector of ITU.

"General Recommendations On Telephone Switching And Signaling—Intelligent Network/Distributed Functional Plane For Intelligent Network CS–1," ITU–T Recommendation Q.1214, ITU—Telecommunication Standardization Sector.

"Revised Draft Of Q.2650 (DSS2/B–ISUP Interworking Recommendation)," Study Group 11, ITU—Telecommunication Standardization Sector, Nov. 29–Dec. 17, 1993.

"Draft Broadband/Narrowband NNI Interworking Recommendation," Study Group 11, Geneva, ITU—Telecommunication Standardization Sector, Dec. 1993.

"Draft Recommendation Q.2761," Study Group 11, Geneva, ITU—Telecommunication Standardization Sector, Nov. 29–Dec. 17, 1993.

"Draft Recommendation Q.2762," Study Group 11, Geneva, ITU—Telecommunication Standardization Sector, Nov. 29–Dec. 17, 1993.

"Clean Final Draft Text For B–ISUP Formats And Codes (Q.2763) In ASN.1," Study Group 11, Geneva, ITU—Telecommunication Standardization Sector, Nov. 29–Dec. 17, 1993.

"Update Draft Of Q.2764 (BQ.764)," Study Group 11, Geneva, ITU—Telecommunication Standardization Sector, Nov. 29–Dec. 17, 1993.

"Draft Recommendation Q.2650," Study Group 11, Geneva, ITU—Telecommunication Standardization Sector, Nov. 29–Dec. 17, 1993.

"Revised Draft Of Q.2650 (DSS2/ B–ISUP Interworking Recommendation)," Study Group 11, Geneva, ITU—Telecommunication Standardization Sector, Nov. 29–Dec. 17, 1993.

"Draft Text For Q.2931 (CH. 1, 2 and 3)," Study Group 11, Geneva, ITU—Telecommunication Standardization Sector, Dec. 1993.

"Rec. Q.2931, Annex G—Status Monitoring Of Spcs," Study Group 11, ITU—Telecommunication Standardization Sector, Nov. 29–Dec. 17, 1993.

"Q.2931 Overview," Geneva, ITU—Telecommunication Standardization Sector, Nov. 29–Dec, 17, 1993.

"Final B–ISUP SDLS," Study Group 11, Geneva, ITU—Telecommunication Standardization Sector, Nov. 29–Dec. 17, 1993.

"Revised Q.2931 Network Side SDL Diagrams," Study Group 11, ITU—Telecommunication Standardization Sector, Nov. 29–Dec. 17, 1993.

"Revision Of Recommendation Of Q.850," Geneva, ITU—T SG 11 WP 2, Dec. 2–15, 1993.

"Final Draft Text For Broadband Capability Set 2 Signaling Requirements," Study Group 11 Attachment "D" Special Drafting Meeting, pp. 1–127, Torino, Italy, ITU–T Telecommunications Standardization Sector, Sep. 13–22, 1993.

ITU Draft Recommendation 1.363.1, B–IDSN ATM Adaptation Layer (AAL) Specification, Types 1 & 2, Jul. 21, 1995.

Yoshikai, N., Et Al., "General Arrangements for Interworking Between B–ISDN and 64kbit/s Based ISDN (Draft Recommendation 1.580), Study Group 13," ITU–T Telecommunication Standardization Sector, pp. 1–51, (Mar. 7, 1994).

"Editorial Modifications For Draft New ITU–T Recommendation 1.731", Study Group 15, Temporary Document 70 (PLE/15), ITUT, 13–24 Nov. May 1995.

"Draft 1.732", Study Group 15, Temporary Document 40 (PLE/15), ITUT, 13–24 Nov. May 1995.

1.751 Asynchronous Transfer Mode (ATM) Management View Of The Network Element View, Study Group 15, Temporary Document 32 (PLE/15), ITUT, 13–24 Nov. May 1995.

"Report Of The Meeting of SWP 13/1–4", Study Group 13, Temporary Document 46 (13/1), ITUT, Mar. 1994.

"Annexes B, C, D, F, H and I Of Q.2931", Study Group 11, Temporary Document 2/II–27 C, ITU—Telecommunication Standardization Sector, Nov. 29–Dec. 17, 1993.

"ISCP Baseline Document (VER 3.1)," ITU Telecommunication Standardization Sector, Centre Studi E Laboratori Telecommunicazioni S.p.A., Geneva, Paglialunga, A., 1993.

Batten, A., "Personal Communications Services And The Intelligent Network," British Telecommunications Engineering, vol. 9, Aug. 1990.

Beckman, Richard T. and Matthews, Joseph R., "Proposal For A Physical Architecture Based On The Harmonized Functional Architecture," Committee T1 Contribution T1S1.5/95–027, Bellcore,. Feb. 20, 1995.

Buhrke, Proposed Unified Functional Model, T1S1.5/95–036, Feb. 1995.

Faynberg, I., et al., "The Support Of Network Interworking And Distributed Context Switching In The In Service Data Function Model," pp. 11–16, 2nd Colloque International, ICIN 92, Mar. 1992.

Fukazawa, M., et al., "Intelligent Network Call Model For Broadband ISDN," pp. 30.6.1–30.6.5, Fujitsu Laboratories Ltd., Japan.

Miller, P., "Intelligent Network/2: A Flexible Framework For Exchange Services," Bell Communications Research Exchange, vol. 3, Issue 3, May/Jun. 1987.

Minoli, Daniel/DVI Communications, Inc./Stevens Institute of Technology and Dobrowski, George/Bell Communications Research (Bellcore), Principles Of Signaling For Cell Relay And Frame Relay © pp. 1–2, 5–6 and 229, 1994.

Russo, E.G., et al., "Intelligent Network Platforms In The U.S.," pp. 26–43, AT&T Technical Journal, 1991.

Sprague, David, "MTP Level–3 Gateway Stp Release 3.2.0," pp. 1–48, TEKELEC, Aug. 4, 1995.

Van Den Broek, W., et al., "Race 2066—Functional Models Of UMTS And Integration Into The Future Networks," pp. 165–172, Electronics & Communications Engineering Journal, Jun. 1993.

"Network Signaling," Telephony, TCX12004, University of Excellence, pp. 5.8–5.17, Oct. 21, 1991.

"A Technical Report On Speech Packetization," Document T1A1/94—Prepared by T1A1.7, Working Group on Specialized Signal Processing.

* cited by examiner

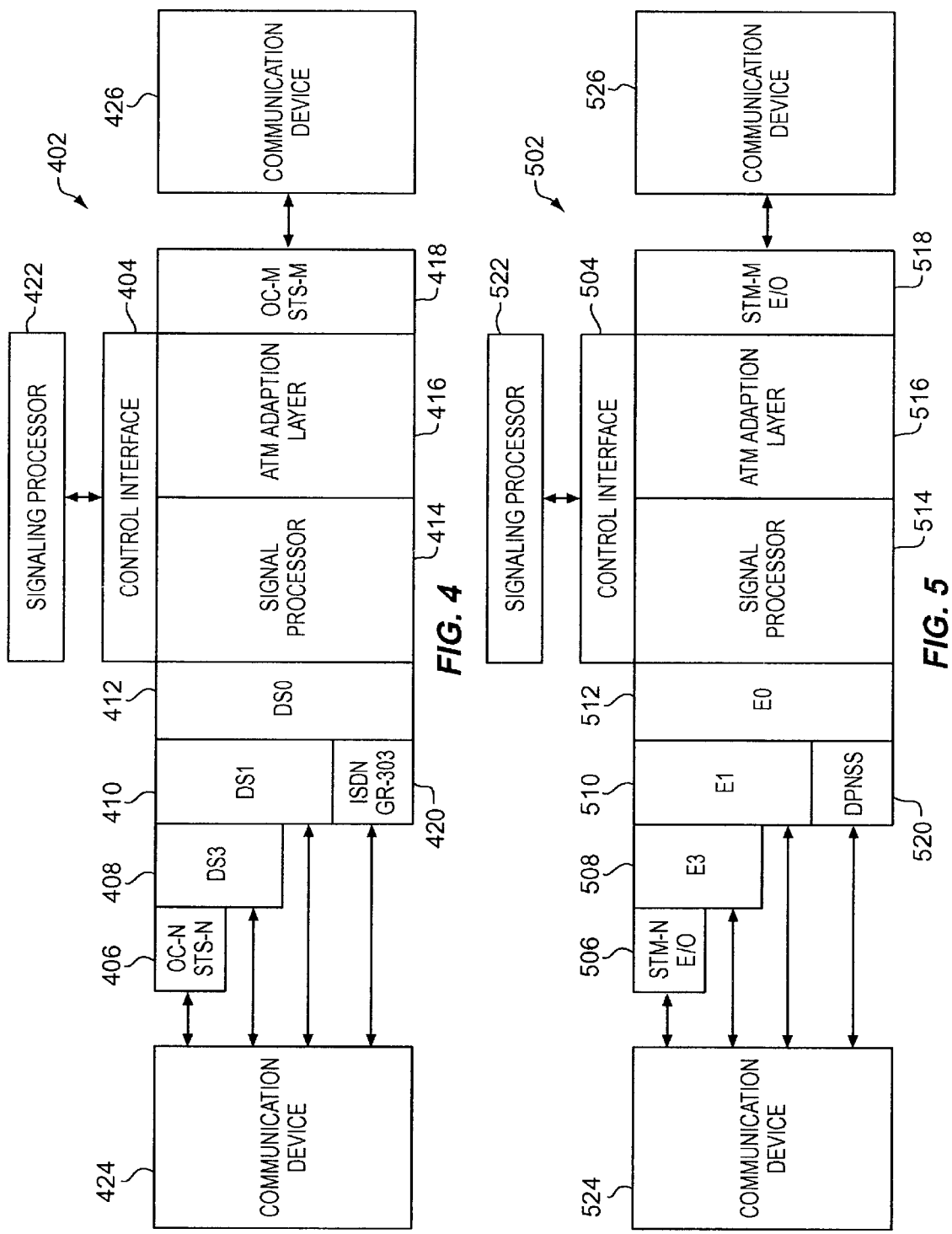

| ASSOCIATED POINT CODE | CIC | VP | VC | TRUNK GROUP NUMBER | GROUP MEMBER NUMBER | HARDWARE IDENTIFIER | ECHO CANCELER | ECHO CONTROL | SATELLITE INDICATOR | CIRCUIT STATUS | CIRCUIT STATE | TIME/ DATE |
|---|---|---|---|---|---|---|---|---|---|---|---|---|
| | | | | | | | | | | | | |
| | | | | | | | | | | | | |
| | | | | | | | | | | | | |

FIG. 9

| TRUNK GROUP NUMBER | GLARE RESOLUTION | CONTINUITY CONTROL | CLLI | SATELLITE TRUNK GROUP | SERVICE INDICATOR | NPA | SEL SEQ | HOP COUNTER | ACC ACTIVE | RE-ATTEMPT CIRCUIT | DEFAULT JIP/LRN | OMI | NEXT FUNCTION | NEXT INDEX |
|---|---|---|---|---|---|---|---|---|---|---|---|---|---|---|
| | | | | | | | | | | | | | | |
| | | | | | | | | | | | | | | |
| | | | | | | | | | | | | | | |

FIG. 10

| EXCEPTION TABLE INDEX | CARRIER SELECTION IDENTIFICATION | CARRIER IDENTIFICATION | CALLED PARTY | | | NEXT FUNCTION | NEXT INDEX |
|---|---|---|---|---|---|---|---|
| | | | NATURE OF ADDRESS | DIGITS FROM | DIGITS TO | | |
| | | | | | | | |
| | | | | | | | |
| | | | | | | | |

| ANI TABLE INDEX | CALLING PARTY CATEGORY | CALLING PARTY/CHARGE NUMBER ||| DATA | ORIGINATING LINE INFORMATION | NEXT FUNCTION | NEXT INDEX |
|---|---|---|---|---|---|---|---|---|
| | | NATURE OF ADDRESS | DIGITS FROM | DIGITS TO | | | | |
| | | | | | | | | |
| | | | | | | | | |

FIG. 13

| CALLED NUMBER SCREENING TABLE INDEX | NATURE OF ADDRESS | DIGITS FROM | DIGITS TO | NEXT FUNCTION | NEXT INDEX |
|---|---|---|---|---|---|
| | | | | | |
| | | | | | |

FIG. 14

| LRN TABLE INDEX | NATURE OF ADDRESS | DIGITS FROM | DIGITS TO | NEXT FUNCTION | NEXT INDEX |
|---|---|---|---|---|---|
| | | | | | |
| | | | | | |

FIG. 15

| CALLED NUMBER TABLE INDEX | NATURE OF ADDRESS | DIGITS FROM | DIGITS TO | NEXT FUNCTION | NEXT INDEX |
|---|---|---|---|---|---|
| | | | | | |
| | | | | | |

FIG. 16

| ROUTING TABLE INDEX | TRANSIT NETWORK SELECTION | | | NEXT FUNCTION #1 | INDEX #1 | SIGNAL ROUTE | NEXT FUNCTION #2 | INDEX #2 | SIGNAL ROUTE | NEXT FUNCTION #3 | INDEX #3 | SIGNAL ROUTE |
|---|---|---|---|---|---|---|---|---|---|---|---|---|
| | NETWORK IDENTIFICATION PLAN | DIGITS | CIRCUIT CODE | | | | | | | | | |
| | | | | | | | | | | | | |
| | | | | | | | | | | | | |

FIG. 17

| TREATMENT TABLE INDEX | MESSAGE RECEIVED CAUSE VALUE | GENERAL LOCATION | CODING STANDARD | CAUSE VALUE | NEXT FUNCTION | NEXT INDEX |
|---|---|---|---|---|---|---|
| | | | | | | |
| | | | | | | |

| MESSAGE TYPE | PARAMETERS | INDEX #1 | INDEX #... | INDEX #N |
|---|---|---|---|---|
| ADDRESS COMPLETE | BACKWARD CALL INDICATOR | | | |
| | ACCESS TRANSPORT | | | |
| | CAUSE INDICATOR | | | |
| | PRIVATE OPTIONAL | | | |
| ANSWER | ACCESS TRANSPORT | | | |
| | BACKWARD CALL INDICATOR | | | |
| | PRIVATE OPTIONAL | | | |
| CALL PROGRESS | EVENT INFORMATION | | | |
| | BACKWARD CALL INDICATOR | | | |
| | ACCESS TRANSPORT | | | |
| | CAUSE INDICATOR | | | |
| | OPTIONAL BACKWARD CALL INDICATOR | | | |
| CIRCUIT RESERVATION | NATURE OF CONNECTION INDICATOR | | | |
| CIRCUIT RESERVATION ACK | N/A | | | |
| CONFUSION | N/A | | | |
| CONTINUITY | CONTINUITY INDICATOR | | | |
| EXIT | OUTGOING TRUNK GROUP NUMBER | | | |
| INFORMATION | ALL PARAMETERS | | | |
| INFORMATION REQUEST | ALL PARAMETERS | | | |
| INITIAL ADDRESS | LNP SIGNALING INSTRUCTION PARAMETER | | | |
| | NATURE OF CONNECTION INDICATOR | | | |
| | FORWARD CALL INDICATOR | | | |
| | CALLING PARTY'S CATEGORY | | | |
| | USER SERVICE INFORMATION | | | |
| | CALLED PARTY NUMBER | | | |
| | ACCESS TRANSPORT | | | |
| | CALLING PARTY NUMBER | | | |
| | CARRIER IDENTIFICATION | | | |
| | CARRIER SELECTION INFORMATION | | | |
| | CHARGE NUMBER | | | |
| | GENERIC ADDRESS | | | |
| | JURISDICTION | | | |
| | ORIGINATING LINE INFORMATION | | | |
| | ORIGINAL CALLED NUMBER | | | |
| | REDIRECTING NUMBER | | | |
| | SERVICE CODE | | | |
| | TRANSIT NETWORK SELECTION | | | |
| | HOP COUNTER | | | |
| PASS ALONG | ALL PARAMETERS | | | |
| RELEASE | CAUSE INDICATOR | | | |
| | ACCESS TRANSPORT | | | |
| | AUTOMATIC CONGESTION CONTROL | | | |
| RELEASE COMPLETE | N/A | | | |
| RESUME | SUSPEND/RESUME INDICATOR | | | |
| SUSPEND | SUSPEND/RESUME INDICATOR | | | |

*FIG. 18*

SYSTEM AND METHOD FOR CONNECTING A CALL WITH AN INTERWORKING SYSTEM

RELATED APPLICATIONS

Not Applicable

FEDERALLY SPONSORED RESEARCH OR DEVELOPMENT

Not Applicable

MICROFICHE APPENDIX

Not Applicable

FIELD OF THE INVENTION

The present invention relates to the field of telecommunications call switching and transport in a system that provides asynchronous transfer mode connections.

BACKGROUND OF THE INVENTION

Broadband systems provide telecommunications providers with many benefits, including more efficient use of more bandwidth and the ability to integrate voice, data, and video communications. Broadband systems provide callers with increased capabilities at lower costs.

Broadband switches, such as asynchronous transfer mode (ATM) switches, are being used to switch calls in and between local exchange carriers and interexchange carriers. These switches are able to convert calls from time division multiplex (TDM) to ATM and from ATM to TDM for transport. In addition, these switches are able to switch calls in either ATM or TDM without converting them.

However, these switches require a system for efficiently processing call signaling to determine where calls are to be routed, if calls need to be converted between ATM and TDM, and what services, if any, are required to process the calls. Ideally, the system should be scaleable and easily updated with improved functionality throughout its operative lifetime.

SUMMARY OF THE INVENTION

The present invention comprises a system for connecting a call having user communications and call signaling. The system comprises a signaling processor that is adapted to receive call signaling, to process the call signaling to select a connection for the call, and to transport a control message that identifies the selected connection. An interworking system is included to receive the control message from the processor, to receive the user communications, and to interwork the user communications between a time division multiplex connection and an asynchronous transfer mode connection for the selected connection according to the control message.

The present invention also comprises a system for connecting a call having user communications and call signaling. The system comprises a signaling processor that is adapted to receive call signaling and to process the call signaling to select a first connection and a second connection for the call. The signaling processor transports a first control message identifying the selected first connection and a second control message identifying the selected second connection. An interworking unit is adapted to receive the first control message from the processor, to receive the user communications, and to interwork the user communications between a time division multiplex connection and an asynchronous transfer mode connection for the selected first connection according to the first control message. An asynchronous transfer mode switch is adapted to receive the second control message from the signaling processor and to switch the user communications to the selected second connection.

In another aspect, the present invention comprises a system for connecting a call having user communications and call signaling. The system comprises a signaling processor that is adapted to receive call signaling, to process the call signaling to select a connection for the call, and to transport a control message identifying the selected connection. An interworking unit receives the user communications and interworks the user communications between a time division multiplex connection and an asynchronous transfer mode connection. The time division multiplex connection is provisioned prior to the call to be interworked with the asynchronous transfer mode connection. Also included is an asynchronous transfer mode switch that is adapted to receive the control message from the signaling processor and to switch the user communications to the selected second connection according to the control message.

BRIEF DESCRIPTION OF THE DRAWINGS

FIG. 4 is a functional diagram of an asynchronous transfer mode interworking unit for use with a synchronous optical network system in accordance with an embodiment of the present invention.

FIG. 5 is a functional diagram of an asynchronous transfer mode interworking unit for use with a synchronous digital hierarchy system in accordance with an embodiment of the present invention.

FIG. 9 is a table diagram of an embodiment of a trunk circuit table used in the signaling processor of FIG. 7.

FIG. 10 is a table diagram of an embodiment of a trunk group table used in the signaling processor of FIG. 7.

FIG. 11 is a table diagram of an embodiment of an exception circuit table used in the signaling processor of FIG. 7.

FIG. 12 is a table diagram of an embodiment of an automated number index table used in the signaling processor of FIG. 7.

FIG. 13 is a table diagram of an embodiment of a called number screening table used in the signaling processor of FIG. 7.

FIG. 14 is a table diagram of an embodiment of a local routing number table used in the signaling processor of FIG. 7.

FIG. 15 is a table diagram of an embodiment of a called number table used in the signaling processor of FIG. 7.

FIG. 16 is a table diagram of an embodiment of a routing table used in the signaling processor of FIG. 7.

FIG. 17 is a table diagram of an embodiment of a treatment table used in the signaling processor of FIG. 7.

FIG. 18 is a table diagram of an embodiment of a message table used in the signaling processor of FIG. 7.

DETAILED DESCRIPTION

Telecommunication systems have a number of communication devices in local exchange and interexchange environments that interact to provide call services to customers. Both traditional and intelligent network (IN) services and resources are used to process, route, or connect a call to a designated destination.

A call has user communications and call signaling. The user communications contain the caller's information, such as a voice communication or data communication, and they are transported over a connection. Call signaling contains information that facilitates call processing, and it is communicated over a link. Call signaling, for example, contains information describing the called number and the calling number. Examples of call signaling are standardized signaling, such as signaling system #7 (SS7), C7, integrated services digital network (ISDN), and digital private network signaling system (DPNSS), which are based on ITU recommendation Q.933. A call can be connected to and from communication devices.

The present invention provides a system to manage connections for calls in an asynchronous transfer mode (ATM) environment. The system processes call signaling to connect calls on a call-by-call basis through time division multiplex (TDM) systems and ATM systems. The system determines how a call is to be connected, to what communication devices the call is to be connected, and what services are required to process the call before, during, and after the call connection. The system controls the communication devices to make the connections.

Figure 1:
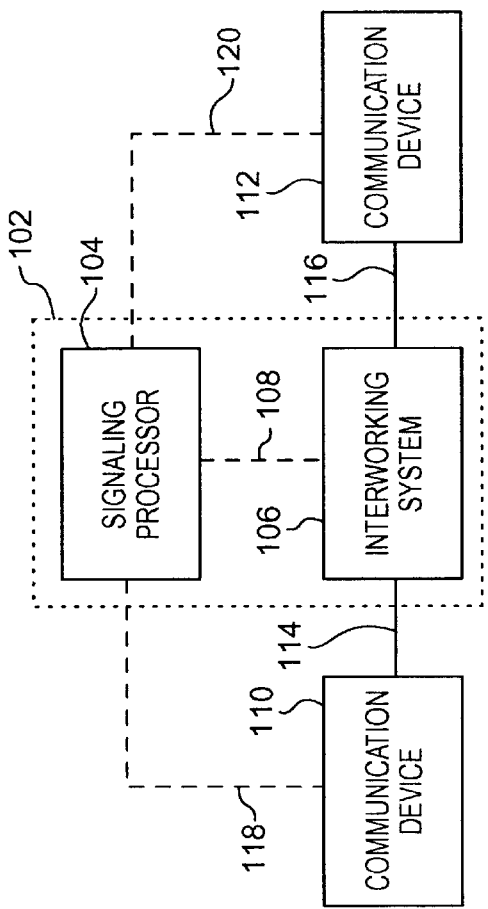
FIG. 1 is a block diagram of an interworking system for managing call connections in accordance with an embodiment of the present invention.

FIG. 1 illustrates one emobidment of a call connection system 102 according to the present invention. Call connection system 102 receives the call signaling and the user communications. Call connection system 102 processes the call signaling to determine a connection for the call and transports the call on the connection. Call connection system 102 interworks call traffic for any required protocol, including TDM and ATM.

Call connection system 102 comprises signaling processor 104 and interworking system 106 linked by link 108. First communication device 110 and second communication device 112 are connected to interworking system 106 by first and second connection 114 and 116, respectively. First communication device 110 is linked to signaling processor 104 by link 118, and second communication device 112 is linked to the signaling processor by link 120.

Connections are used to transport user communications and other device information between communication devices and between the elements and devices of call connection system 102. The term "connection" as used herein means the transmission media used to carry user communications between elements of call connection system 102 and other devices. For example, a connection could carry a user's voice, computer data, or other communication device data. A connection can be associated with either in-band communications or out-of-band communications.

Links are used to transport call signaling and control messages. The term "link" as used herein means a transmission media used to carry call signaling and control messages containing, for example, device instructions and data. A link can carry, for example, out-of-band signaling such as that used in SS7, C7, ISDN, DPNSS, B-ISDN, GR-303, or could be via local area network (LAN), or data bus call signaling. A link can be, for example, an AAL5 data link, FDDI, ethernet, DS0, or DS1. In addition, a link, as shown in the figures, can represent a single physical link or multiple links, such as one link or a combination of links of ISDN, SS7, TCP/IP, or some other data link. The term "control message" as used herein means a control or signaling message, a control or signaling instruction, or a control or signaling signal, whether proprietary or standardized, that conveys information from one point to another.

Signaling processor 104 is a signaling platform that can receive and process call signaling. Based on the processed call signaling, signaling processor 104 selects processing options, services, or resources for the user communications and generates and transmits control messages that identify the communication device, processing option, service, or resource that is to be used. Signaling processor 104 also selects virtual connections and circuit-based connections for call routing and generates and transports control messages that identify the selected connections. One embodiment of a signaling processor is discussed in detail below.

Interworking system 106 interworks traffic between various protocols. Preferably, interworking system 106 interworks between ATM traffic and non-ATM traffic. Interworking system 106 can connect calls over pre-provisioned paths without receiving communication messages from signaling processor 104. Although, typically, interworking system 106 operates in accordance with control messages received from signaling processor 104 over link 108. These control messages typically are provided on a call-by-call basis and typically identify an assignment between a DS0 and a VP/VC for which user communications are interworked. In some instances, interworking system 106 may transport control messages which may include data.

Communication devices 110 and 112 each may comprise customer premises equipment (CPE), a service platform, a switch, an exchange carrier, a remote digital terminal, or any other device capable of initiating, handling, or terminating a call. CPE may include, for example, a telephone, a computer, a facsimile machine, or a private branch exchange. A service platform can be, for example, any enhanced computer platform that is capable of processing calls. A remote digital terminal is a device that concentrates analog twisted pairs from telephones and other like devices and converts the analog signals to a digital format known as GR-303.

The system of FIG. 1 operates as follows when first communication device 104 transports a call to second communication device 106. In this example, first communication device 110 is a local network, second communication device 112 is an ATM device, and link 120 is a VP/VC.

First communication device 110 transports call signaling to signaling processor 104 over link 118. Typically, call signaling is SS7 call signaling, however it will be appreciated that the invention is not limited to a specific protocol. First communication device 110 also transports user communications to interworking system 106 over connection 114. Typically, the user communications are TDM formatted user communications.

Signaling processor 104 processes the call signaling to select a connection 116. Selected connection 116 is a VP/VC. Signaling processor 104 sends a control message to interworking system 106 identifying selected connection 116 over which the user communications will be transported. Signaling processor 104 also sends a control message to second communication device 112 over link 120 identifying selected connection 116 over which the user communications are to be interworked.

Interworking system 106 receives user communications from first communication device 110 over connection 114 and control messaging from signaling processor 104 over link 108. Interworking unit 106 interworks user communications between the TDM format and the ATM format. Therefore, interworking unit 104 converts user communications from TDM user communications to ATM cells that identify selected connection 116 and transports the ATM cells over the selected connection to second communication device 112.

Figure 2:
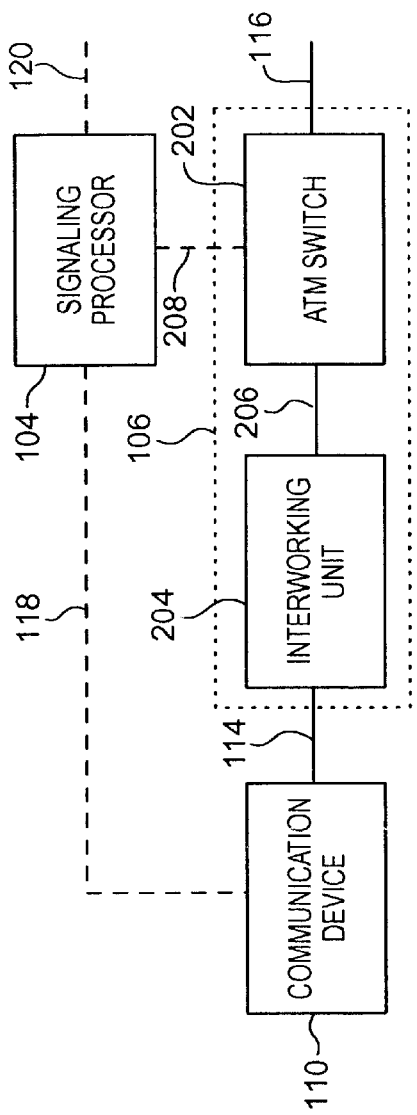
FIG. 2 is a block diagram of the interworking system of FIG. 1 in accordance with an embodiment of the present invention.

FIG. 2 further illustrates one embodiment of interworking system 106. In the embodiment depicted in FIG. 2, interworking system 106 comprises ATM switch 202 and interworking unit 204 connected by connection 206. Link 208 links signaling processor 104 to ATM switch 202.

ATM switch 202 establishes connections in response to signaling from signaling processor 104. ATM switch 202 interworks between ATM connections and TDM connections. ATM switch 202 also cross connects ATM connections with other ATM connections. In addition, ATM switch 202 switches calls from TDM connections to other TDM connections.

Interworking unit 204 of FIG. 2 interworks user communications between TDM and ATM. Interworking unit 204 is pre-provisioned with connections. If a call comes in on a particular connection, it automatically is interworked with a second particular connection without the need for a control message to identify the second particular connection.

The system of FIG. 2 operates as follows for a call from first communications device 110 in which the first communications device is a TDM device, and connection 114 is a DS0. First communications device 110 transports call signaling to signaling processor 104 and user communications to interworking unit 204 of interworking system 106. Signaling processor 104 processes the call signaling and selects VP/VC connection 116 for the call. Signaling processor 104 transports a control message to ATM switch 202 over link 208 identifying selected VP/VC connection 116. Signaling processor 104 transports another control message identifying selected VP/VC connection 116 over link 120 to a receiving communication device (not shown).

Interworking unit 204 receives user communications on the DS0 connection 114 and automatically interworks the user communications to ATM cells on VP/VC connection 206. ATM switch 202 receives ATM cells over VP/VC connection 206 and receives a control message from signaling processor 104 over link 208. ATM switch 202 cross connects ATM cells from VP/VC connection 206 to selected VP/VC connection 116 identified in the control message from signaling processor 104.

Figure 3:
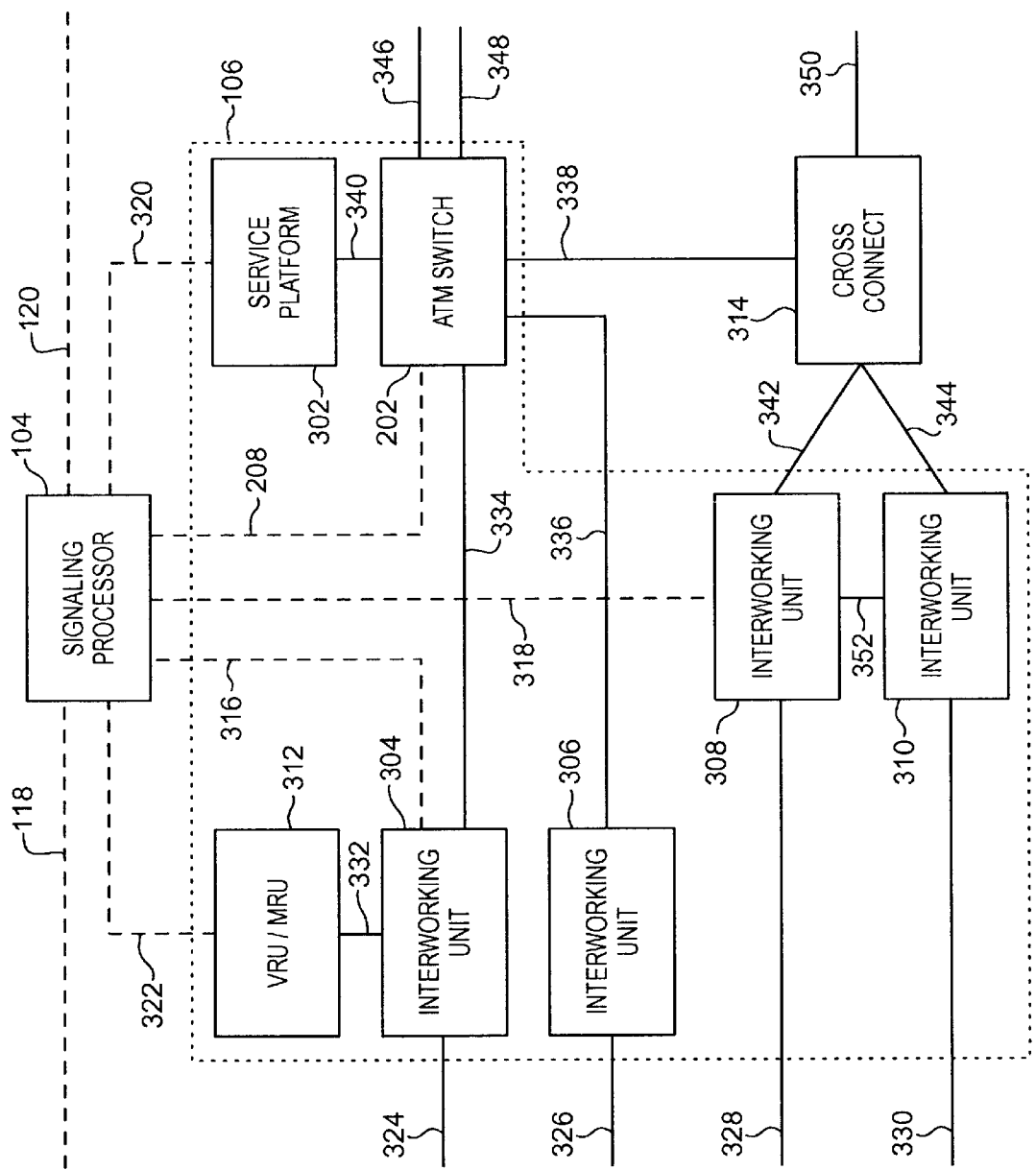
FIG. 3 is a block diagram of the interworking system of FIG. 1 in accordance with an embodiment of the present invention.

FIG. 3 illustrates another embodiment of interworking system 106 of the present invention. Interworking system 106 comprises ATM switch 202, service platform 302, first interworking unit 304, second interworking unit 306, third interworking unit 308, fourth interworking unit 310, and a service platform such as voice response unit/media response unit (VRU/MRU) 312. ATM switch 202, third interworking unit 308, and fourth interworking unit 310 are connected to cross connect 314. It will be appreciated that an interworking system may include a greater or fewer number of communication devices, such as greater or fewer interworking units which are either controlled or not controlled by signaling processor 104.

Signaling processor 104 is linked to first and third interworking units 304 and 308 over links 316 and 318, respectively, and to service platform 302 and VRU/MRU 312 through links 320 and 322, respectively. Connections 324, 326, 328, and 330 connect to interworking units 304, 306, 308, and 310. Connection 332 connects first interworking unit 304 with VRU/MRU 312. Connections 334, 336, 338 and 340 connect ATM switch 202 with first and second interworking units 304 and 306, cross connect 314, and service platform 302. Connections 342 and 344 connect third and fourth interworking units 308 and 310 with cross connect 314. Also, two connections 346 and 348 extend from ATM switch 202, and connection 350 extends from cross connect 314. In addition, connection 352 is between third interworking unit 308 and fourth interworking unit 310.

Signaling processor 104 operates in accordance with the signaling processor of FIGS. 1 and 2. ATM switch 202 operates in accordance with the ATM switch of FIG. 2.

Service platform 302 provides enhanced services for call processing for user communications received from ATM switch 202. Service platform 302 may have one or multiple applications to provide multiple services. Such services may comprise voice messaging, facsimile messaging, mail boxes, voice recognition, conference bridging, calling card, menu routing, N00 servicing such as freephone and 900 call servicing, prepay card, tone detection, and call forwarding.

Service platform 302 processes user communications in accordance with control messages from signaling processor 104. Preferably, the control message instructs service platform 302 how to process user communications and which application to use in the service platform to process the user communications. For example, service platform 302 may process user communications, return processing results to signaling processor 104, and return the processed user communications to ATM switch 202 through connection 340 to be transported to another communications device.

First and third interworking units 304 and 308 are controlled by control instructions from signaling processor 104. First and third interworking units 304 and 308 interwork traffic between various protocols. Preferably, interworking units 304 and 308 interwork between ATM traffic and non-ATM traffic. Interworking units 304 and 308 operate in accordance with control messages received from signaling processor 104 over links 316 and 318, respectively. These control messages typically are provided on a call-by-call basis and typically identify an assignment between a DS0 and a VP/VC for which user communications are interworked. In some instances, interworking units 304 and 308 may transport control messages which may include data.

Second and fourth interworking units 306 and 310 are not controlled by control instructions from signaling processor 104. Second and fourth interworking units 306 and 310 interwork user communications between TDM and ATM. Connections are pre-provisioned through interworking units 306 and 310. If a call comes in on a particular connection, interworking units 306 and 310 automatically interwork the user communications with another particular connection without the need for a control message to identify the particular connection. As used herein, the term "automatically" when used in context with interworking or cross connecting means the process of interworking or cross connecting is completed without a control message from signaling processor 104 identifying the process to be completed.

VRU/MRU 312 is a type of service platform that performs processing for a call in accordance with the control messages from signaling processor 104. The control message instructs VRU/MRU 312 how to provide the processing for the call and which application to use to process the call. VRU/MRU 312 typically provides voice or media responses or messages to a caller or to a called party.

Cross connect 314 is any device, such as an ATM cross connect, that provides a plurality of ATM virtual connections between, for example, ATM switch 302, third interworking unit 308, fourth interworking unit 310, and other communication devices (not shown). In ATM, virtual connections for user communications or virtual connections for links using ATM can be designated by the VP/VC in the ATM cell header. An example of an ATM cross connect is the NEC Model 20.

The system of FIG. 3 operates in accordance with the following examples. It will be appreciated that first and third interworking units 304 and 308 and ATM switch 202 may not always be controlled by signaling processor 104. In some instances, connections are "static" so that a particular incoming DS0 is always connected to a particular outgoing ATM connection. In addition, first and third interworking units 304 and 308 and ATM switch 202 may be controlled by signaling processor 104 so that the interworking or cross connecting is dynamic on a call-by-call basis. In such instances, for example, signaling processor 104 selects an ATM connection for an incoming DS0 and identifies that ATM connection in a control message to particular interworking unit 304 or 308. Then, particular interworking unit 304 or 308 interworks the particular DS0 with the selected ATM connection.

In the following examples, signaling processor 104 can receive or transport call signaling over links 118 or 120. Links 118 and 120 can be links from, for example, a TDM device, a local exchange carrier, or an ATM device. Thus, links 118 and 120 can be ATM VP/VCs. Also, signaling processor 104 can receive or transport call signaling over links 208, 316, and 318. In such a case, links 208, 316, and 318 can be ATM VP/VCs. In addition, control messages can be transported through all of the links.

Preferably signaling processor 104 sends call signaling or control messages to other communication devices when a call is being set up, while a call is connected, and when a call is being disconnected or disassociated. For example, the signaling processor will send control messages over link 120 to second communication device 112 of FIG. 1.

In some instances, the elements of interworking system 106 may contain converters to convert call signaling to a form that can be processed by signaling processor 104. For example, first interworking unit 304 may receive call signaling and user communications in-band, convert the call signaling to SS7 signaling, and pass it to signaling processor 104 over link 316. Alternatively, signaling processor 104 may convert the call signaling to a desired form prior to processing.

It will be appreciated that in all of the following examples, a call may be connected in the opposite direction. Thus, a call can be connected from a TDM device to an ATM device using particular paths of connections so that it is interworked from TDM to ATM for the connection. Another call between the same or similar communication devices which originates or is handled from an ATM device and transported to a TDM device can be interworked from ATM to TDM for the same path of connections.

In addition, for all of the following examples, any of interworking units 304, 306, 308, or 310 or ATM switch 202 may provide echo control. The echo control may be controlled by signaling processor 104 for interworking units 304 and 308 and ATM switch 202.

In a first example, a call is connected through first interworking unit 304 and ATM switch 202, both of which are controlled by signaling processor 104. Signaling processor 104 processes the call signaling to select connections 334 and 346 for the call. Signaling processor 104 transports a first control message over link 316 to first interworking unit 304 identifying VP/VC connection 334 with which to interwork user communications. Signaling processor 104 transports a second control message over link 208 to ATM switch 202 identifying another VP/VC connection 346 over which to cross connect user communications. Signaling processor 104 transports a third control message to a receiving communications device, such as over link 120 to second communications device 112 of FIG. 1, identifying connection 346 over which the call is being connected.

First interworking unit 304 receives the user communications, for example over DS0 324 in the TDM format, and receives the first control message from signaling processor 104 over link 316. First interworking unit 304 cancels the echo and interworks the user communications to selected VP/VC connection 334 which is identified in the first control message.

ATM switch 202 receives the ATM cells for the call over VP/VC connection 334 and the second control message from signaling processor 104 over link 208. ATM switch 202 cross connects the ATM cells to VP/VC connection 346 which is identified in the second control message.

In another example, a call is connected through first interworking unit 304, which is controlled by signaling processor 104, and ATM switch 202, which is not controlled by signaling processor 104. Signaling processor 104 processes the call signaling to select VP/VC connection 334 for the call. Signaling processor 104 transports a control message over link 316 to first interworking unit 304 identifying VP/VC connection 334 with which to interwork the user communications.

First interworking unit 304 receives the user communications and receives the control message. First interworking unit 304 interworks the user communications to selected VP/VC connection 334 which is identified in the control message. ATM switch 202 receives the user communications for the call over VP/VC connection 334 and automatically cross connects the user communications to VP/VC connection 346. In this example, the path through ATM switch 202 was pre-provisioned.

In another example, a call is connected through first interworking unit 304 and ATM switch 202, both of which are controlled by signaling processor 104, and it is processed by VRU/MRU 312. The call is connected in a manner similar to the first example. However, signaling processor 104 determines that a connection first must be made to VRU/MRU 312 over connection 332.

Prior to requiring first interworking unit 304 to interwork the call to connection 334, signaling processor 104 transports a control signal to first interworking unit 304 identifying connection 332 with which the first interworking unit initially is to connect the call. First interworking unit 304 makes connection 332 for the call. Signaling processor 104 may also transport a control message to VRU/MRU 312 identifying services that the VRU/MRU will provide for the call. For example, signaling processor 104 may require VRU/MRU 312 to play a message to the caller requesting entry of a personal identification number (PIN) on a calling card call. One skilled in the art will appreciated that some user input is required to invoke the service provided by a service platform such as VRU/MRU 312.

After VRU/MRU 312 processes the call with the required service, the VRU/MRU can transport a control or data message to signaling processor 104 informing the signaling processor that the service is completed. Signaling processor 104 then transports a control message to first interworking unit 304 requiring the first interworking unit to disassociate connection 332 to VRU/MRU 312 and to make connection 334 to ATM switch 202. Processing of the call continues as explained in the first example.

In another example, a call is connected through first interworking unit 304 and ATM switch 202, both of which are controlled by signaling processor 104, and it is processed by service platform 302. The call is connected in a manner similar to the first example. However, signaling processor 104 determines that a connection must be made during call set-up to service platform 302 over connection 340.

Prior to signaling processor 104 selecting a connection with which ATM switch 202 will cross connect the call, signaling processor 104 transports a control signal to ATM switch 202 identifying connection 340 over which to initially connect the call. If connection 340 is an ATM connection, ATM switch 202 cross connects the call on connection 340 to service platform 302. If connection 340 is a TDM connection, ATM switch 202 interworks the call with the connection.

Signaling processor 104 also transports a control message to service platform 302 identifying services that the service platform is to provide for the call. For example, signaling processor 104 may require service platform 302 to obtain additional digits from the caller and Information from a customer database for a call using a caller's calling card. Alternately, the call may be an N00 call, and signaling processor 104 may require information from a database for billing.

After service platform 302 processes the call with the required service, the service platform can transport a control or data message to signaling processor 104 informing the signaling processor that the service is completed and transports any data associated with the service. Signaling processor 104 processes the control or data message and selects connection 346 with which to cross connect the call. Signaling processor 104 then transports a control message to ATM switch 202 requiring the ATM switch to disassociate connection 340 to service platform 302 and to connect the call to connection 346. ATM switch 202 either cross connects or interworks the call with connection 340 as required.

In another example, a call is connected through a static connection through first interworking unit 304, ATM switch 202, and second interworking unit 306. When first interworking unit 304 receives user communications over particular DS0 connection 324, the first interworking unit cancels the echo and interworks the user communications with particular VP/VC connection 334 without a control message. The ATM switch receives the user communications over particular VP/VC connection 334 and automatically cross connects user communications to another particular VP/VC connection 336 to second interworking unit 306. Second interworking unit 306 receives the user communications over second particular VP/VC connection 336 and automatically interworks user communications with DS0 connection 326.

In another example, a call is connected through a static connection through first interworking unit 304, controlled at ATM switch 202, and further connected by a static connection through second interworking unit 306. Signaling processor 104 processes the call signaling to select connection 336 for the call between ATM switch 302 and second interworking unit 306. Signaling processor 104 transports a control message over link 208 to ATM switch 202 identifying VP/VC connection 336 over which to cross connect the call.

When first interworking unit 304 receives user communications over a particular DS0 connection 324, the first interworking unit automatically interworks user communications with VP/VC connection 334. ATM switch 302 receives user communications over VP/VC connection 334 and receives the control message from signaling processor 104. ATM switch 302 cross connects the user communications on VP/VC connection 336 which was identified in the control message. Second interworking unit 306 receives the user communications over VP/VC connection 336 and automatically interworks the user communications with DS0 connection 326.

In another example, a call is connected through first interworking unit 304, ATM switch 202, and cross connect 314. Signaling processor 104 processes the call signaling to select connections 334 and 338 for the call. Signaling processor 104 transports a first control message over link 316 to first interworking unit 304 identifying VP/VC connection 334 with which to interwork the user communications. Signaling processor 104 transports a second control message over link 208 to ATM switch 202 identifying another VP/VC connection 338 over which to cross connect the call. Signaling processor 104 transports a third control message to a receiving communications device, such as over link 120 to second communications device 112 of FIG. 1, identifying VP/VC connection 346 over which the call is being connected.

First interworking unit 304 receives the user communications, for example over DS0 324 in the TDM format, and receives the first control message. First interworking unit 304 interworks the user communications to VP/VC connection 334 identified in the first control message. In this example, first interworking unit 304 may cancel the echo if required by the first control message.

ATM switch 202 receives the user communications for the call over VP/VC connection 334 and the control message from signaling processor 104 over link 208. ATM switch 202 cross connects the user communications to VP/VC connection 338 which was identified in the second control message.

Cross connect 314 receives user communications over VP/VC connection 338. Cross connect 314 has pre-provisioned connections. Thus, cross connect 314 cross connects user communications to VP/VC connection 350 based upon the connection upon which the user communications arrived at the cross connect.

In another example, a call is connected through second interworking unit 306, which is not controlled by signaling processor 104, and ATM switch 202, which is controlled by the signaling processor. Signaling processor 104 processes the call signaling to select VP/VC connection 348 for the call from ATM switch 302. Signaling processor 104 transports a control message over link 208 to ATM switch 202 identifying VP/VC connection 348 over which to cross connect the call.

When second interworking unit 306 receives the user communications over DS0 connection 326, the second interworking unit automatically interworks the user communications with VP/VC connection 336. ATM switch 302 receives the user communications over VP/VC connection 336 and receives the control message from signaling processor 104. ATM switch 202 cross connects the user communications on VP/VC connection 348 which was identified in the control message.

In another example, a call is connected through second interworking unit 306, which is not controlled by signaling processor 104, through ATM switch 202, which is controlled by the signaling processor, and through cross connect 314. Signaling processor 104 processes the call signaling to select VP/VC connection 338 for the call between ATM switch 302 and cross connect 314. Signaling processor 104 transports a control message over link 208 to ATM switch 202 identifying VP/VC connection 338 over which to cross connect the call.

When second interworking unit 306 receives the user communications over DS0 connection 326, the second interworking unit automatically interworks the user communications with VP/VC connection 336. ATM switch 302 receives the user communications over VP/VC connection 336 and receives the control message from signaling processor 104. ATM switch 302 cross connects the user communications on VP/VC connection 338 which was identified in the control message. Cross connect 314 receives the user communications over the VP/VC connection 338 and cross connects the user communications over a pre-provisioned path on, for example, VP/VC connection 350. It will be appreciated that the path also can be pre-provisioned to either third interworking unit 308 over VP/VC connection 342 or fourth interworking unit 310 over VP/VC connection 344.

In another example, a call is connected through third interworking unit 308 and fourth interworking unit 310, neither of which is controlled by signaling processor 104. When third interworking unit 308 receives the user communications over DS0 connection 328, the third interworking unit interworks the user communications with VP/VC connection 352. Fourth interworking unit 310 receives the user communications over VP/VC connection 352 and automatically interworks the user communications with another particular DS0 connection 330. Either third interworking unit 308 or fourth interworking unit 310 may cancel the echo in this example.

In another example, a call is connected through third interworking unit 308, which is controlled by signaling processor 104, and fourth interworking unit 310. Signaling processor 104 processes the call signaling to select VP/VC connection 352 for the call between third interworking unit 308 and fourth interworking unit 310. Signaling processor 104 transports a control message over link 218 to third interworking unit 308 identifying VP/VC connection 352 over which to interwork the call.

Third interworking unit 308 receives the control message and the user communications. Third interworking unit 308 interworks the user communications with VP/VC connection 352 which was identified in the control message. Fourth interworking unit 310 receives the user communications over VP/VC connection 352 and automatically interworks the user communications with DS0 connection 330.

In another example, a call is connected through third interworking unit 308 and fourth interworking unit 310, neither of which is controlled by signaling processor 104, and cross connect 314. When third interworking unit 308 receives the user communications over DS0 connection 328, the third interworking unit automatically interworks the user communications with VP/VC connection 342. Cross connect 314 receives the user communications over VP/VC connection 342 and automatically cross connects the user communications to another particular VP/VC connection 344 to fourth interworking unit 310. Fourth interworking unit 310 receives the user communications over the second particular VP/VC connection 344 and automatically interworks the user communications with DS0 connection 330.

In another example, a call is connected through third interworking unit 308, which is controlled by signaling processor 104, fourth interworking unit 310, and cross connect 314. Signaling processor 104 processes the call signaling to select VP/VC connection 342 for the call between third interworking unit 308 and fourth interworking unit 310. Signaling processor 104 transports a control message over link 318 to third interworking unit 308 identifying VP/VC connection 342 over which to interwork the call.

Third interworking unit 308 receives the control message and the user communications. Third interworking unit 308 interworks the user communications with VP/VC connection 342 which identified in the control message. Cross connect 314 receives the user communications and cross connects them on a pre-provisioned VP/VC connection 344. Fourth interworking unit 310 receives the user communications over cross connected VP/VC connection 344 and automatically interworks the user communications with DS0 connection 330.

In another example, a call is connected through third interworking unit 308, which is controlled by signaling processor 104, and cross connect 314. Signaling processor 104 processes the call signaling to select VP/VC connection 342 for the call between third interworking unit 308 and cross connect 314. Signaling processor 104 transports a control message over link 318 to third interworking unit 308 identifying the selected VP/VC connection 342 over which to interwork the call.

Third interworking unit 308 receives the control message and the user communications. Third interworking unit 308 interworks the user communications with VP/VC connection 342 which was identified in the control message. Cross connect 314 receives the user communications and cross connects them on a pre-provisioned VP/VC connection 350.

In another example, a call is connected through fourth interworking unit 310 and cross connect 314. Fourth interworking unit 310 receives the user communications on a particular DS0 connection 330 and automatically interworks the user communications with a particular VP/VC connection 344 to cross connect 314. Cross connect 314 receives the user communications over VP/VC connection 344 and cross connects them on a pre-provisioned path to another particular VP/VC connection 350.

In another example, a call is connected through ATM switch 202 over two ATM connections 346 and 348. For a particular call, ATM switch 202 receives the user communications on VP/VC connection 346 and automatically cross connects them on a pre-provisioned path to another VP/VC connection 348. However, for another call, signaling processor 104 controls the cross connect in ATM switch 202 by transporting a control message to ATM switch 202 identifying the second VP/VC connection 348 with which to cross connect the user communications. In this case, ATM switch 202 cross connects the user communications according to the control message. ATM switch 202 may cancel the echo if required.

In another example, a call is connected through ATM switch 202 over two ATM connections 346 and 348, and the call is processed by service platform 302. In this example, signaling processor 104 transports a control message to service platform 302 identifying the service to be performed on the call and transports a control message to the ATM switch identifying connection 340 to service platform 302. ATM switch 202 receives the user communications in the ATM format and interworks the user communications to TDM connection 340 to service platform 302. After service platform 302 processes the call with the required service, the service platform informs signaling processor 104. Signaling processor 104 sends a new control message to ATM switch 202 identifying a new connection 348. ATM switch 202 dissociates the connection 340 and cross connects the call to VP/VC connection 348.

In another example, a call is connected through ATM switch 202 over ATM connection 346 and through cross connect 314 to ATM connection 350. In this example, ATM switch 202 cross connects the call from VP/VC connection 346 to VP/VC connection 338. Cross connect 314 cross connects the call from VP/VC connection 338 to VP/VC connection 350. It will be appreciated that ATM switch 202 can perform the cross connect of the call pursuant to a control message from signaling processor 104 identifying VP/VC connection 338. ATM switch 202 also can perform the cross connect when the path is pre-provisioned and static, and ATM switch 202 then automatically cross connects the call.

In another example, a call is connected over connection 350 through cross connect 314 to ATM switch 202, which is controlled by signaling processor 104, and out connection 346. In this example, signaling processor 104 processes the call signaling and selects connection 346. Signaling processor 104 transports a control message to ATM switch 202 identifying selected connection 346. Cross connect 314 receives the user communications over VP/VC connection 350 and cross connects them to VP/VC connection 338. ATM switch 202 receives the control message and the user communications for the call. Typically, connection 346 is a TDM connection, and ATM switch 202 interworks the user communications with connection 346. However, if connection 346 is an ATM connection, ATM switch 202 cross connects the user communications to connection 346.

In another example, a call is connected through ATM switch 202 from ATM connection 346 and through cross connect 314 and third interworking unit 308, which is controlled by signaling processor 104. Signaling processor 104 processes the call signaling to select connection 328 for the call from third interworking unit 308. Signaling processor 104 transports a control message over link 318 to third interworking unit 308 identifying TDM connection 330 over which to interwork the call.

In this example, ATM switch 202 cross connects user communications to VP/VC connection 338. ATM switch 202 can perform the cross connect of the call pursuant to a control message from signaling processor 104 identifying VP/VC connection 338. ATM switch 202 also can perform the cross connect when the path is pre-provisioned and static, and ATM switch 202 then automatically cross connects the call. Then, the user communications are cross connected through cross connect 314 to VP/VC connection 342. Third interworking unit 308 receives the control message and the user communications. Third interworking unit 308 interworks the user communications with the selected TDM connection 328.

In another example, a call is connected from ATM connection 346 through ATM switch 202, which is controlled by signaling processor 104, and through cross connect 314 and third interworking unit 308, which is not controlled by signaling processor 104. Signaling processor 104 receives the call signaling and selects VP/VC connection 338. Signaling processor 104 transports a control message to ATM switch 202 identifying the selected VP/VC connection 338. ATM switch 202 receives the control message over link 208 and the user communications over connection 346. ATM switch 202 cross connects the user communications to VP/VC connection 338 according to the control message. Cross connect 314 receives the user communications and cross connects them to VP/VC connection 342. Third interworking unit 308 receives the user communications over VP/VC connection 342 and automatically interworks them with TDM connection 328.

In another example, a call is connected over VP/VC connection 350 through cross connect 314 and through third interworking unit 308, which is not controlled by signaling processor 104, to connection 328. Cross connect 314 receives the user communications over VP/VC 350 and cross connects them to third interworking unit 308 over VP/VC 342. Third interworking unit 308 receives the user communications and automatically interworks them with TDM connection 328.

In another example, a call is connected through ATM switch 202 from ATM connection 346 and through cross connect 314 and fourth interworking unit 310. In this example, ATM switch 202 cross connects the user communications to VP/VC connection 338. ATM switch 202 can perform the cross connect of the call pursuant to a control message from signaling processor 104 identifying VP/VC connection 338. ATM switch 202 also can perform the cross connect when the path is pre-provisioned and static, and ATM switch 202 then automatically cross connects the call. Then, the user communications are cross connected through cross connect 314 to VP/VC connection 344. Fourth interworking unit 310 receives the user communications on VP/VC connection 344 and automatically interworks the user communications with particular TDM connection 330.

It will be appreciated that ATM switch 202 is also capable of switching call traffic from TDM connections to other TDM connections, for example where connections 346 and 348 are TDM connections. This can be either controlled by signaling processor 104 through the use of control messages or automatically switched.

In some embodiments, interworking unit 304 is operational to interconnect an incoming DS0 to an outgoing DS0 in response to a control message from signaling processor 104. Interworking unit 304 can also interwork a DS0 with a VP/VC connection in response to a control message from signaling processor 104. Interworking unit 304 can apply digital signal processing, such as echo cancellation, to calls as well. This could be handled automatically for all calls being interworked to ATM, or it could occur selectively based on control messages from signaling processor 104.

For example, on a first call, signaling processor 104 may instruct interworking unit 304 to interconnect an incoming DS0 on connection 324 to an outgoing DS0 on connection 324. On a second call, signaling processor 104 may instruct interworking unit 304 to route the call through digital signal processing, such as echo cancellation, and on to ATM switch 202 over connection 334. Signaling processor 104 would then instruct ATM switch 202 to switch the VP/VC from first interworking unit 304 to the VP/VC for transport from ATM switch 202 on, for example, connection 346. The VP/VC between first interworking unit 304 and ATM switch 202 can be preassigned. Also, this VP/VC can be set dynamically by signaling processor 104.

THE ATM INTERWORKING UNIT

FIG. 4 shows one embodiment of an interworking unit which is ATM interworking unit 402 suitable for the present invention for use with a SONET system, but other interworking units that support the requirements of the invention also are applicable. ATM interworking unit 402 may receive and transmit in-band and out-of-band calls.

ATM interworking unit 402 preferably has control interface 404, OC-N/STS-N interface 406, DS3 interface 408, DS1 interface 410, DS0 interface 412, signal processor 414, ATM adaptation layer (AAL) 416, OC-M/STS-M interface 418, and ISDN/GR-303 interface 420. As used herein in conjunction with OC or STS, "N" refers to an integer, and "M" refers to an integer.

Control interface 404 receives control messages originating from signaling processor 422, identifies DS0 and virtual connection assignments in the control messages, and provides these assignments to AAL 416 for implementation. The control messages are received over an ATM virtual connection and through OC-M/STS-M interface 418 to control interface 404 or directly through the control interface from a link.

OC-N/STS-N interface 406, DS3 interface 408, DS1 interface 410, DS0 interface 412, and ISDN/GR-303 interface 420 each can receive user communications from communication device 424. Likewise, OC-M/STS-M interface 418 can receive user communications from communication device 426.

OC-N/STS-N interface 406 receives OC-N formatted user communications and STS-N formatted user communications and converts the user communications to the DS3 format. DS3 interface 408 receives user communications in the DS3 format and converts the user communications to the DS1 format. DS3 interface 408 can receive DS3s from OC-N/STS-N interface 406 or from an external connection. DS1 interface 410 receives user communications in the DS1 format and converts the user communications to the DS0 format. DS1 interface 410 receives DS1s from DS3 interface 408 or from an external connection. DS0 interface 412 receives user communications in the DS0 format and provides an interface to AAL 416. ISDN/GR-303 interface 420 receives user communications in either the ISDN format or the GR-303 format and converts the user communications to the DS0 format. In addition, each interface may transmit user communications in like manner to communication device 424.

OC-M/STS-M interface 418 is operational to receive ATM cells from AAL 416 and to transmit the ATM cells over the connection to communication device 426. OC-M/STS-M interface 418 also may receive ATM cells in the OC or the STS format and transmit them to AAL 416.

AAL 416 comprises both a convergence sublayer and a segmentation and reassembly (SAR) sublayer. AAL 416 obtains the identity of the DS0 and the ATM VP/VC from control interface 404. AAL 416 is operational to convert between the DS0 format and the ATM format. AALs are known in the art, and information about AALs is provided by International Telecommunications Union (ITU) document 1.363, which is incorporated herein by reference. An AAL for voice calls is described in U.S. Pat. No. 5,606,553 entitled "Cell Processing for Voice Transmission" which is incorporated herein by reference.

Calls with multiple 64 Kilo-bits per second (Kbps) DS0s are known as Nx64 calls. If desired, AAL 416 can be configured to accept control messages through control interface 404 for Nx64 calls. ATM interworking unit 402 is able to interwork, multiplex, and demultiplex for multiple DS0s. A technique for processing VP/VCs is disclosed in U.S. patent application Ser. No. 08/653,852, which was filed on May 28, 1996, and entitled "Telecommunications System with a Connection Processing System," and which is incorporated herein by reference.

DS0 connections are bi-directional, and ATM connections are typically uni-directional. As a result, two virtual connections in opposing directions typically will be required for each DS0. Those skilled in the art will appreciate how this can be accomplished in the context of the invention. For example, the cross-connect can be provisioned with a second set of VP/VCs in the opposite direction as the original set of VP/VCs.

In some embodiments, it may be desirable to incorporate digital signal processing capabilities at the DS0 level. It may also be desired to apply echo cancellation to selected DS0 circuits. In these embodiments, signal processor 414 is included either separately (as shown) or as a part of DS0 interface 412. Signaling processor 422 is configured to send control messages to ATM interworking unit 402 to implement particular features on particular DS0 circuits. Alternatively, lookup tables may be used to implement particular features for particular circuits or VP/VCs.

FIG. 5 shows another embodiment of an interworking unit which is ATM interworking unit 502 suitable for the present invention for use with an SDH system. ATM interworking unit 502 has control interface 504, STM-N electrical/optical (E/O) interface 506, E3 interface 508, E1 interface 510, E0 interface 512, signal processor 514, AAL 516, STM-M electrical/optical (E/O) interface 518, and digital private network signaling system (DPNSS) interface 520. As used herein in conjunction with STM, "N" refers to an integer, and "M" refers to an integer.

Control interface 504 receives control messages from signaling processor 522, identifies E0 and virtual connection assignments in the control messages, and provides these assignments to AAL 516 for implementation. The control messages are received over an ATM virtual connection and through STM-M interface 518 to control interface 404 or directly through the control interface from a link.

STM-N E/O interface 506, E3 interface 508, E1 interface 510, E0 interface 512, and DPNSS interface 520 each can receive user communications from a second communication device 524. Likewise, STM-M E/O interface 518 can receive user communications from a third communication device 526.

STM-N E/O interface 506 receives STM-N electrical or optical formatted user communications and converts the user communications from the STM-N electrical or STM-N optical format to the E3 format. E3 interface 508 receives user communications in the E3 format and converts the user communications to the E1 format. E3 interface 508 can receive E3s from STM-N E/O interface 506 or from an external connection. E1 interface 510 receives user communications in the E1 format and converts the user communications to the E0 format. E1 interface 510 receives E1s from STM-N E/O interface 506 or E3 interface 508 or from an external connection. E0 interface 512 receives user communications in the E0 format and provides an interface to AAL 516. DPNSS interface 520 receives user communications in the DPNSS format and converts user communications to the E0 format. In addition, each interface may transmit user communications in a like manner to communication device 524.

STM-M E/O interface 518 is operational to receive ATM cells from AAL 516 and to transmit the ATM cells over the connection to communication device 526. STM-M E/O interface 518 may also receive ATM cells in the STM-M E/O format and transmit them to AAL 516.

AAL 516 comprises both a convergence sublayer and a segmentation and reassembly (SAR) sublayer. The AAL obtains the identity of the E0 and the ATM VP/VC from control interface 504. AAL 516 is operational to convert between the E0 format and the ATM format, either in response to a control instruction or without a control instruction. AAL's are known in the art. If desired, AAL 516 can be configured to receive control messages through control interface 504 for Nx64 user communications.

E0 connections are bidirectional and ATM connections typically are uni-directional. As a result, two virtual connections in opposing directions typically will be required for each E0. Those skilled in the art will appreciate how this can be accomplished in the context of the invention.

In some instances, it may be desirable to incorporate digital signal processing capabilities at the E0 level. Also, it may be desirable to apply echo cancellation. In these embodiments, signal processor 514 is included either separately (as shown) or as a part of E0 interface 512. Signaling processor 522 is configured to send control messages to ATM interworking unit 502 to implement particular features on particular circuits. Alternatively, lookup tables may be used to implement particular features for particular circuits or VP/VCs.

THE SIGNALING PROCESSOR

The signaling processor receives and processes telecommunications call signaling, control messages, and customer data to select connections that establish communication paths for calls. In the preferred embodiment, the signaling processor processes SS7 signaling to select connections for a call. Call processing in the call processor and the associated maintenance that is performed for call processing is described in a U.S. Patent Application entitled "System and Method for Treating a Call for Call Processing" filed on the same date as this application, which is assigned to the same assignee as this patent application, and which is incorporated herein by reference.

In addition to selecting connections, the signaling processor performs many other functions in the context of call processing. It not only can control routing and select the actual connections, but it also can validate callers, control echo cancelers, generate accounting information, invoke intelligent network functions, access remote databases, manage traffic, and balance network loads. One skilled in the art will appreciate how the signaling processor described below can be adapted to operate in the above embodiments.

Figure 6:
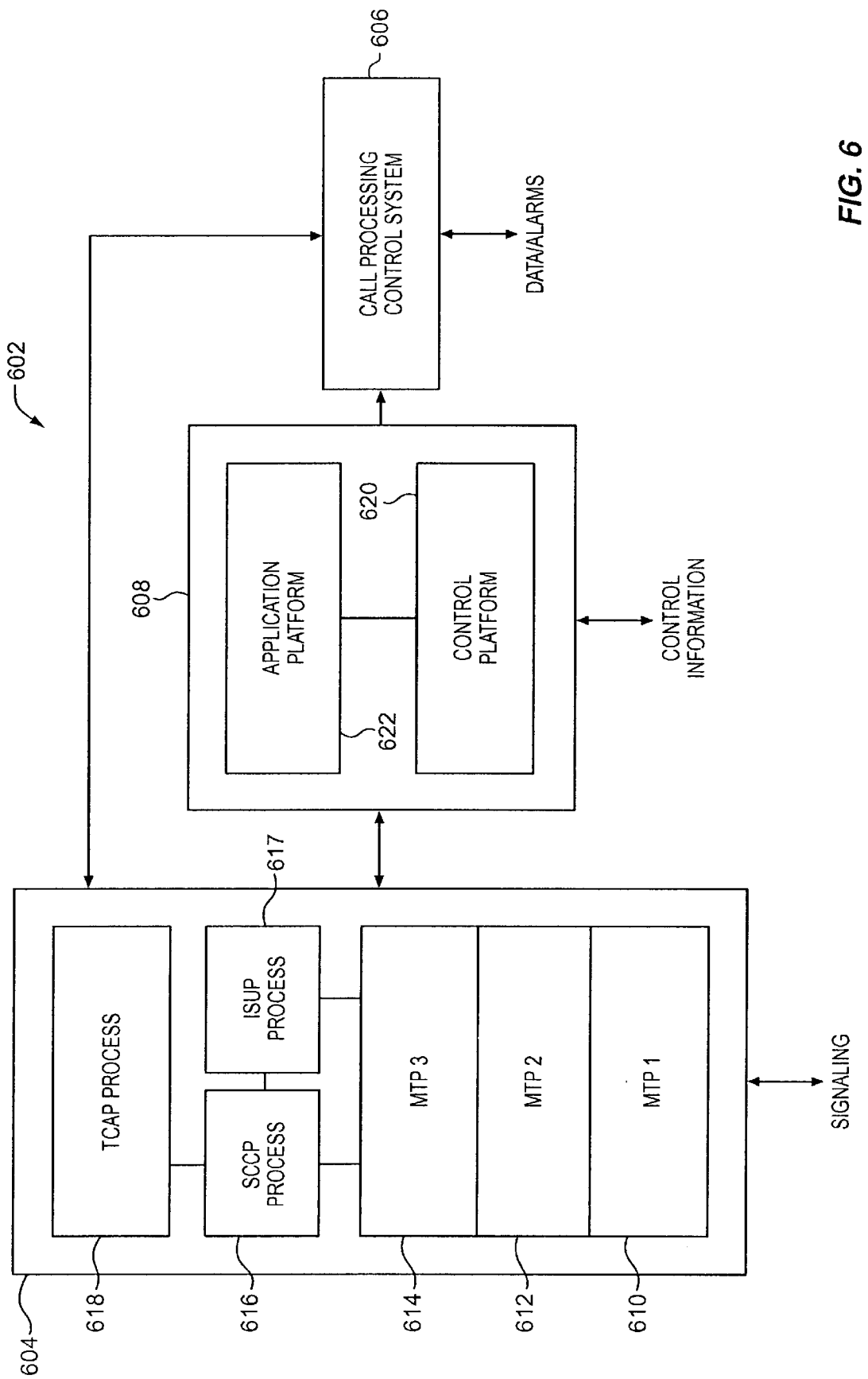
FIG. 6 is a block diagram of a signaling processor constructed in accordance with an embodiment of the present system.

FIG. 6 depicts an embodiment of a signaling processor. Other versions also are contemplated. In the embodiment of FIG. 6, signaling processor 602 has signaling interface 604, call processing control system 606 (CPCS), and call processor 608. It will be appreciated that signaling processor 608 may be constructed as modules in a single unit or as multiple units.

Signaling interface 604 is coupled externally to signaling systems—in particular to signaling systems having a message transfer part (MTP), an ISDN user part (ISUP), a signaling connection control part (SCCP), an intelligent network application part (INAP), and a TCAP. Signaling interface 604 preferably is a platform that comprises an MTP level 1 610, an MTP level 2 612, and MTP level 3 614, an SCCP process 616, an ISUP process 617, and a TCAP process 618. Signaling interface 604 also has INAP functionality.

Signaling interface 604 may be linked to a communication device (not shown). For example, the communication device may be an SCP which is queried by the signaling interface with an AIN 0.1 SCP TCAP query to obtain additional call-associated data. The answer message may have additional information parameters that are required to complete call processing. The communication device also may be an STP or other device.

Signaling interface 604 is operational to transmit, process, and receive call signaling. The TCAP, SCCP, ISUP, and INAP functionality use the services of MTP to transmit and receive the messages. Preferably, signaling interface 604 transmits and receives SS7 messages for MTP, TCAP, SCCP, and ISUP. Together, this functionality is referred to as an "SS7 stack," and it is well known. The software required by one skilled in the art to configure an SS7 stack is commercially available. One example is the OMNI SS7 stack from Dale, Gesek, McWilliams & Sheridan, Inc. (the DGM&S company).

The processes of signaling interface 604 process information that is received in message signal units (MSUs) and convert the information to call information elements that are sent to call processor 608 to be processed. A call information element may be, for example, an ISUP IAM message parameter from the MSU. Signaling interface 604 strips the unneeded header information from the MSU to isolate the message information parameters and passes the parameters to call processor 608 as the call information elements. Examples of these parameters are the called number, calling number, and user service information. Other examples of messages with information elements are an ANM, an ACM, an REL, an RLC, and an INF. In addition, call information elements are transferred from call processor 608 back to signaling interface 604, and the information elements are reassembled into MSUs and transferred to a signaling point.

CPCS 606 is a management and administration system. CPCS 606 is the user interface and external systems interface into call processor 608. CPCS 606 serves as a collection point for call-associated data such as translations having call routing data, logs, operational measurement data, statistical information, accounting information, and other call data.

CPCS 606 accepts data, such as the translations, from a source such as an operations system and updates the data in the tables in call processor 608. CPCS 606 makes sure this data is in the correct format prior to transferring the data to call processor 608. CPCS 606 also provides configuration data to other devices including to call processor 608, signaling interface 604, and the interworking unit (not shown). In addition, CPCS 606 provides for remote control of call monitoring and call tapping applications from call processor 608.

CPCS 606 also serves as a collection point for alarms. Alarm information is transferred to CPCS 606. CPCS 606 then transports alarm messages to the required communication device. For example, CPCS 606 can transport alarms to an operations center.

CPCS 606 also has a human-machine interface (HMI). This allows a person to log onto CPCS 606 and manage data tables or review data tables in the CPCS or provide maintenance services.

Call processor 608 processes call signaling and controls an ATM interworking unit, such as an ATM interworking multiplexer (mux) that performs interworking of DS0s and VP/VCs. However, call processor 608 may control other communications devices and connections in other embodiments.

Call processor 608 comprises control platform 620 and application platform 622. Each platform 620 and 622 is coupled to the other platform.

Control platform 620 is comprised of various external interfaces including an interworking unit interface, an echo interface, a resource control interface, a call information interface and an operations interface. Control platform 620 is externally coupled to an interworking unit control, an echo control, a resource control, accounting, and operations. The interworking unit interface exchanges messages with at least one interworking unit. These messages comprise DS0 to VP/VC assignments, acknowledgments, and status information. The echo control interface exchanges messages with echo control systems. Messages exchanged with echo control systems might include instructions to enable or disable echo cancellation on particular DS0s, acknowledgments, and status information.

The resource control interface exchanges messages with external resources. Examples of such resources are devices that implement continuity testing, encryption, compression, tone detection/transmission, voice detection, and voice messaging. The messages exchanged with resources are instructions to apply the resource to particular DS0s, acknowledgments, and status information. For example, a message may instruct a continuity testing resource to provide a loopback or to send and detect a tone for a continuity test.

The call information interface transfers pertinent call information to a call information processing system, such as to CPCS 606. Typical call information includes accounting information, such as the parties to the call, time points for the call, and any special features applied to the call. One skilled in the art will appreciate how to produce the software for the interfaces in control platform 620.

Application platform 622 processes signaling information from signaling interface 604 to select connections. The identity of the selected connections are provided to control platform 620 for the interworking unit interface. Application platform 622 is responsible for validation, translation, routing, call control, exceptions, screening, and error handling. In addition to providing the control requirements for the interworking unit, application platform 622 also provides requirements for echo control and resource control to the appropriate interface of control platform 620. In addition, application platform 622 generates signaling information for transmission by signaling interface 604. The signaling information might be for ISUP, INAP, or TCAP messages to external network elements. Pertinent information for each call is stored in a call buffer information (CBI) location for the call. The CBI can be used for tracking and accounting the call.

Application platform 622 preferably operates in general accord with the Basic Call Model (BCM) defined by the ITU. An instance of the BCM is created to handle each call. The BCM includes an originating process and a terminating process. Application platform 622 includes a service switching function (SSF) that is used to invoke the service control function (SCF). Typically, the SCF is contained in an SCP. The SCF is queried with TCAP or INAP messages transported by signaling interface 604 which are initiated with information from the SSF in application platform 622. The originating or terminating processes will access remote databases with intelligent network (IN) functionality via the SSF.

Software requirements for application platform 622 can be produced in specification and description language (SDL) defined in ITU-T Z.100. The SDL can be converted into C code. A real time case tool such as SDT from Telelogic, Inc. or Object Time from Object Time, Inc. can be used. Additional C and C++ code can be added as required to establish the environment.

Call processor 608 can be comprised of the above-described software loaded onto a computer. The computer can be a Tandem S4000 using the non-stop Unix operating system and conventional database systems. It may be desirable to utilize the multi-threading capability of a Unix operating system.

From FIG. 6, it can be seen that application platform 622 processes signaling information to control numerous systems and facilitate call connections and services. The SS7 signaling is exchanged between call processor 608 and external components through signaling interface 604, and control information is exchanged with external systems through control platform 620. Advantageously, signaling interface 604, CPCS 606, and call processor 608 are not integrated into a switch central processing unit (CPU) that is coupled to a switching matrix. Unlike an SCP, the components of signaling processor 602 are capable of processing ISUP messages independently of TCAP queries.

SS7 MESSAGE DESIGNATIONS

SS7 messages are well known. Designations for various SS7 messages commonly are used. Those skilled in the art are familiar with the following message designations:

ACM—Address Complete Message
ANM—Answer Message
BLO—Blocking
BLA—Blocking Acknowledgment
CPG—Call Progress
CRG—Charge Information
CGB—Circuit Group Blocking
CGBA—Circuit Group Blocking Acknowledgment
GRS—Circuit Group Reset
GRA—Circuit Group Reset Acknowledgment
CGU—Circuit Group Unblocking
CGUA—Circuit Group Unblocking Acknowledgment
CQM—Circuit Group Query
CQR—Circuit Group Query Response
CRM—Circuit Reservation Message
CRA—Circuit Reservation Acknowledgment
CVT—Circuit Validation Test
CVR—Circuit Validation Response
CFN—Confusion
COT—Continuity
CCR—Continuity Check Request
EXM—Exit Message
INF—Information
INR—Information Request IAM—Initial Address
LPA—Loop Back Acknowledgment
PAM—Pass Along
REL—Release
RLC—Release Complete
RSC—Reset Circuit
RES—Resume
SUS—Suspend
TCAP—Transaction Capabilities Application Part
UBL—Unblocking
UBA—Unblocking Acknowledgment
UCIC—Unequipped Circuit Identification Code.

CALL PROCESSOR TABLES

Call processing typically entails two aspects. First, an incoming or "originating" connection is recognized by an originating call process. For example, the initial connection that a call uses to enter a network is the originating connection in that network. Second, an outgoing or "terminating" connection is selected by a terminating call process. For example, the terminating connection is coupled to the originating connection in order to extend the call through the network. These two aspects of call processing are referred to as the originating side of the call and the terminating side of the call.

Figure 7:
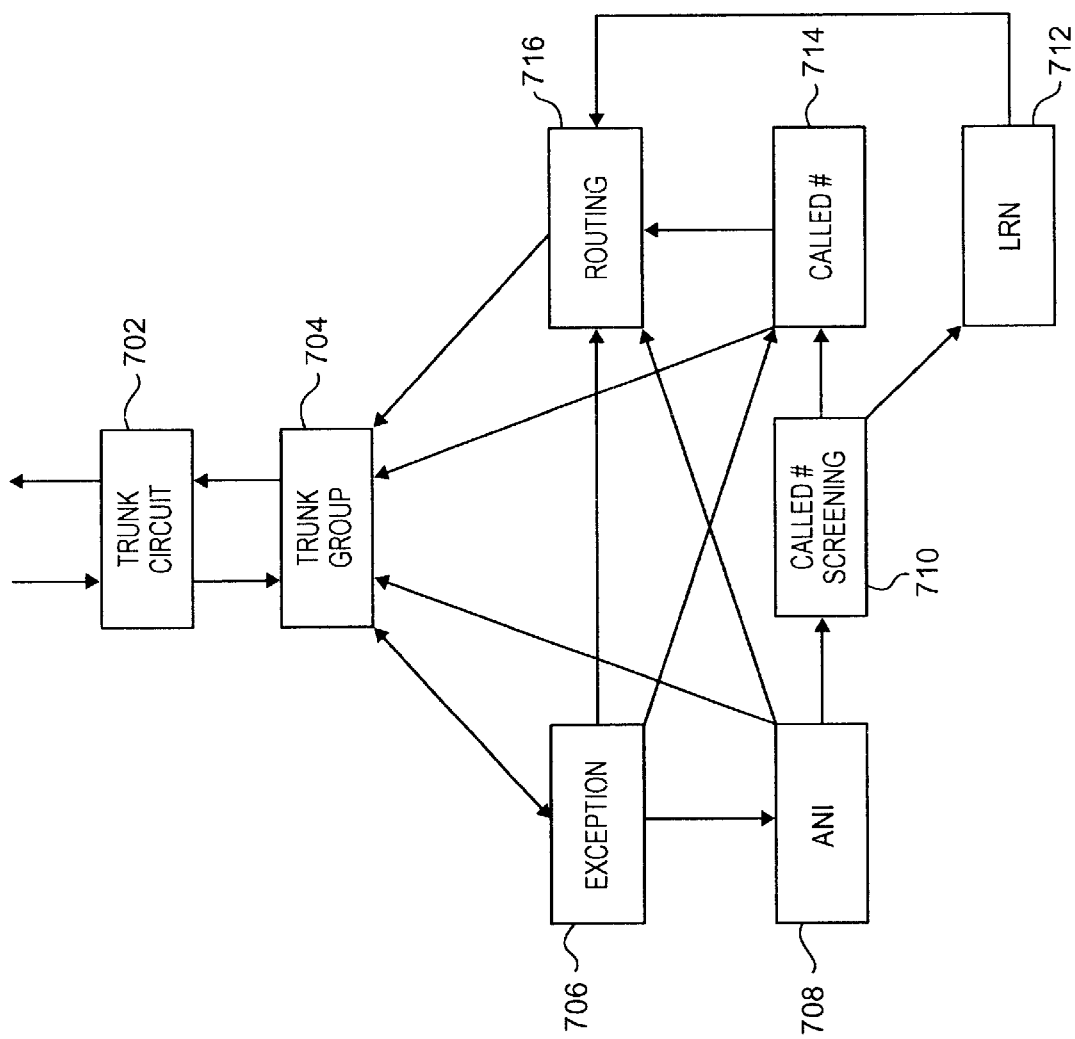
FIG. 7 is a block diagram of an embodiment of a data structure having tables that are used in the signaling processor of FIG. 6.

FIG. 7 depicts a data structure preferably used by application platform 622 of FIG. 6 to execute the BCM. This is accomplished through a series of tables that point to one another in various ways. The pointers are typically comprised of next function and next index designations. The next function points to the next table, and the next index points to an entry or a range of entries in that table. The data structure has trunk circuit table 702, trunk group table 704, exception table 706, ANI table 708, called number screening table 710, location routing number (LRN) table 712, called number table 714, and routing table 716.

Trunk circuit table 702 contains information related to the connections. Typically, the connections are DS0 or ATM connections. Initially, trunk circuit table 702 is used to retrieve information about the originating connection. Later, the table is used to retrieve information about the terminating connection. When the originating connection is being processed, the trunk group number in trunk circuit table 702 points to the applicable trunk group for the originating connection in trunk group table 704.

Trunk group table 704 contains information related to the originating and terminating trunk groups. When the originating connection is being processed, trunk group table 704 provides information relevant to the trunk group for the originating connection and typically points to exception table 706.

Exception table 706 is used to identify various exception conditions related to the call that may influence the routing or other handling of the call. Typically, exception table 706 points to ANI table 708. Although, exception table 706 may point directly to trunk group table 704, called number table 714, or routing table 716.

ANI table 708 is used to identify any special characteristics related to the caller's number. The caller's number is commonly known as automatic number identification (ANI). ANI table 708 typically points to called number screening table 710. Although, ANI table 708 may point directly to trunk group table 704 or routing table 716.

Called number screening table 710 is used to provide the trigger detection point (TDP) for an AIN 0.1 SCP TCAP query. It is used, for example, with the local number portability (LNP) feature. Called number screening table 710 invokes a TCAP. According to the TCAP response, either LRN table 712 or called number table 714 is accessed.

LRN table 712 is used to identify routing requirements based on the called number for those calls that have a return response from an LNP query to an SCP, indicating that the called number is ported. LRN table 712 points to routing table 716.

Called number table 714 is used to identify routing requirements based on the called number. This will be the case for standard telephone calls. Called number table 714 typically points to routing table 716. Although, it may point to trunk group table 704.

Routing table 716 has information relating to the routing of the call for the various connections. Routing table 716 is entered from a pointer in exception table 706, ANI table 708, LRN table 712, or called number table 714. Routing table 716 typically points to a trunk group in trunk group table 704.

When exception table 706, ANI table 708, called number table 714, or routing table 716 point to trunk group table 704, they effectively select the terminating trunk group. When the terminating connection is being processed, the trunk group number in trunk group table 704 and trunk circuit table 706 is the index that points to the trunk group index. The trunk group index contains the applicable terminating connection in trunk circuit table 704.

The terminating trunk circuit is used to extend the call. The trunk circuit is typically a VP/VC or a DS0. Thus, it can be seen that by migrating through the tables, a terminating connection can be selected for a call.

Figure 8:
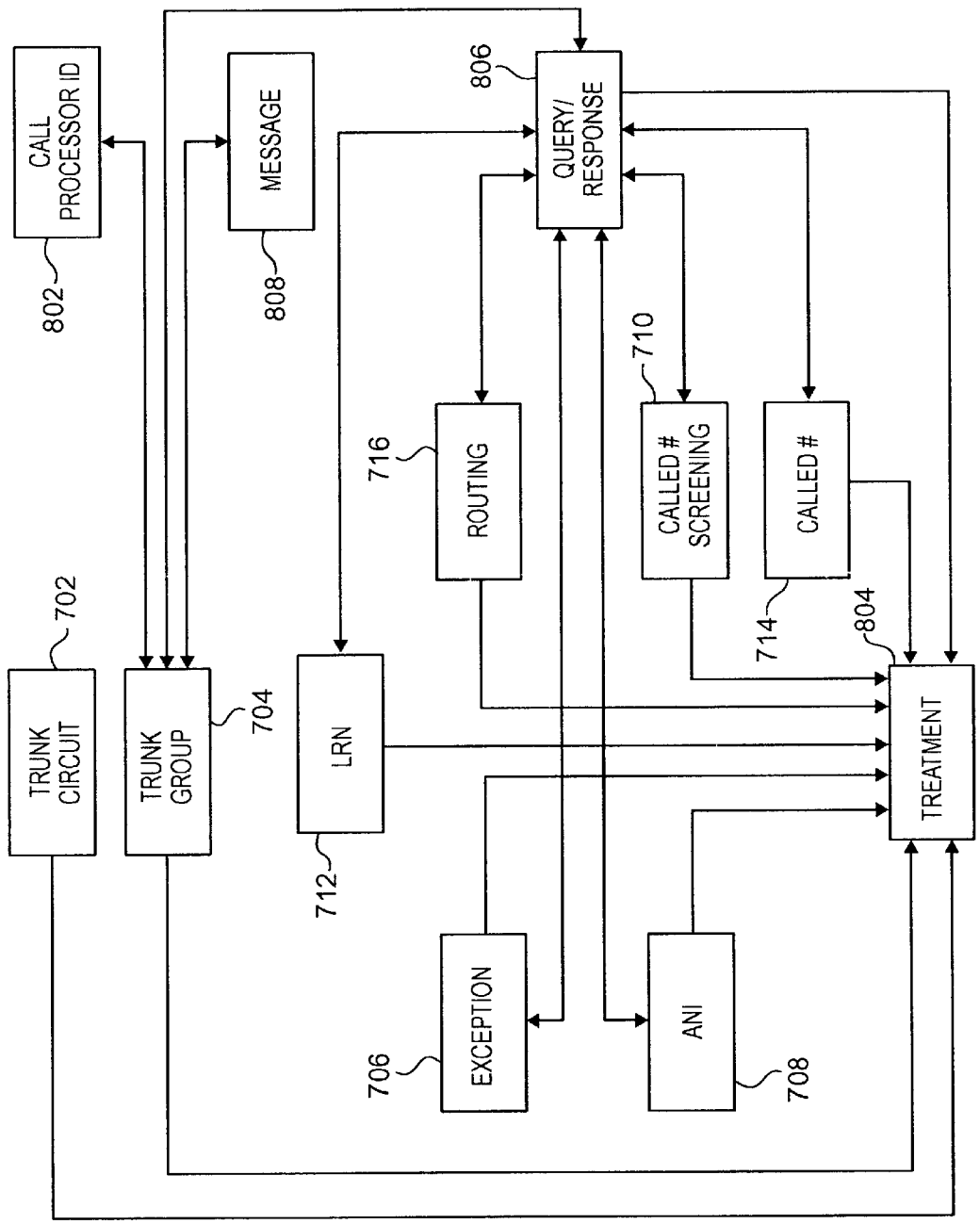
FIG. 8 is a block diagram of an embodiment of additional tables that are used in the signaling processor of FIG. 7.

FIG. 8 is an overlay of FIG. 7. The tables from FIG. 7 are present, but for clarity, their pointers have been omitted. FIG. 8 illustrates additional tables that can be accessed from the tables of FIG. 7. These include call processor ID table 802, treatment table 804, query/response table 806, and message table 808.

Call processor ID table 802 contains various call processor SS7 point codes. It can be accessed from trunk group table 704, and it points back to trunk group table 704.

Treatment table 804 identifies various special actions to be taken in the course of call processing. This will typically result in the transmission of a release message (REL) and a cause value. Treatment table 804 can be accessed from trunk circuit table 702, trunk group table 704, exception table 706, ANI table 708, called number screening table 710, LRN table 712, called number table 714, routing table 716, and query/response table 806.

Query/response table 806 has information used to invoke the SCF. It can be accessed by trunk group table 704, exception table 706, ANI table 708, called number screening table 710, LRN table 712, called number table 714, and routing table 716. It points to trunk group table 704, exception table 706, ANI table 708, called number screening table 710, LRN table 712, called number table 714, routing table 716, and treatment table 804.

Message table 808 is used to provide instructions for signaling messages from the termination side of the call. It can be accessed by trunk group table 704 and points to trunk group table 704.

FIGS. 9–18 depict examples of the various tables described above. FIG. 9 depicts an example of the trunk circuit table. Initially, the trunk circuit table is used to access information about the originating circuit. Later in the processing, it is used to provide information about the terminating circuit. For originating circuit processing, the associated point code is used to enter the table. This is the point code of the switch or call processor associated with the originating circuit. For terminating circuit processing, the trunk group number is used to enter the table.

The table also contains the circuit identification code (CIC). The CIC identifies the circuit which is typically a DS0 or a VP/VC. Thus, the invention is capable of mapping the SS7 CICs to the ATM VP/VC. If the circuit is ATM, the VP and the VC also can be used for identification. The group member number is a numeric code that is used for terminating circuit selection. The hardware identifier identifies the location of the hardware associated with the originating circuit. The echo canceler (EC) identification (ID) entry identifies the echo canceler for the originating circuit.

The remaining fields are dynamic in that they are filled during call processing. The echo control entry is filled based on three fields in signaling messages: the echo suppresser indicator in the IAM or circuit reservation message (CRM) and the information transfer capability in the IAM. This information is used to determine if echo control is required on the call. The satellite indicator is filled with the satellite indicator in the IAM or CRM. It may be used to reject a call if too many satellites are used. The circuit status indicates if the given circuit is idle, blocked, or not blocked. The circuit state indicates the current state of the circuit, for example, active or transient. The time/date indicates when the idle circuit went idle.

FIG. 10 depicts an example of the trunk group table. During origination processing, the trunk group number from the trunk circuit table is used to key into the trunk table. Glare resolution indicates how a glare situation is to be resolved. Glare is dual seizure of the same circuit. If the glare resolution entry is set to "even/odd," the network element with the higher point code controls the even circuits, and the network element with the lower point code controls the odd circuits. If the glare resolution entry is set to "all," the call processor controls all of the circuits. If the glare resolution entry is set to "none," the call processor yields. The continuity control entry lists the percent of calls requiring continuity tests on the trunk group.

Continuity control indicates whether continuity is to be checked. The common language location identifier (CLLI) entry is a Bellcore standardized entry. The satellite trunk group entry indicates that the trunk group uses a satellite. The satellite trunk group entry is used in conjunction with the satellite indicator field described above to determine if the call has used too many satellite connections and, therefore, must be rejected. The service indicator indicates if the incoming message is from a call processor (ATM) or a switch (TDM). The outgoing message index (OMI) points to the message table so that outgoing messages can obtain parameters. The associated number plan area (NPA) entry identifies the area code.

Selection sequence (SEL SEQ) indicates the methodology that will be used to select a connection. The selection sequence field designations tell the trunk group to select circuits based on the following: least idle, most idle, ascending, descending, clockwise, and counterclockwise. The hop counter is decremented from the IAM. If the hop counter is zero, the call is released. Automatic congestion control (ACC) active indicates whether or not congestion control is active. If automatic congestion control is active, the call processor may release the call. During termination processing, the next function and index are used to enter the trunk circuit table Reattempt circuit indicates if an outgoing call can be reattempted on a different circuit within the same trunk group.

Default jurisdiction information parameter (JIP) is an NPA-NXX value that is used to identify the switch from which the call originates. If an ISUP JIP is not received in an IAM, the default JIP is the value recorded on the call processor CBI. Alternately, this field can hold a default LRN having a ten digit form of NPA-NXX-XXXX in which the first six digits can populate the JIP parameter. If an ISUP LRN is not received in an IAM, the default IAM is the value recorded on the call processor CBI. The next function and next index entries point to the next table.

FIG. 11 depicts an example of the exception table. The index is used as a pointer to enter the table. The carrier selection identification (ID) parameter indicates how the caller reached the network and is used for routing certain types of calls. The following are used for this field: spare or no indication, selected carrier identification code presubscribed and input by the calling party, selected carrier identification code presubscribed and not input by the calling party, selected carrier identification code presubscribed and no indication of input by the calling party, and selected carrier identification code not presubscribed and input by the calling party. The carrier identification (ID) indicates the network that the caller wants to use. This is used to route calls directly to the desired network.

The called party number nature of address differentiates between 0+ calls, 1 + calls, test calls, and international calls. For example, international calls might be routed to a pre-selected international carrier. The called party "digits from" and "digits to" focus further processing unique to a defined range of called numbers. The "digits from" field is a decimal number ranging from 1–15 digits. It can be any length and, if filled with less than 15 digits, is filled with 0s for the remaining digits. The "digits to" field is a decimal number ranging from 1–15 digits. It can be any length and, if filled with less than 15 digits, is filled with 9s for the remaining digits. The next function and next index entries point to the next table which is typically the ANI table.

FIG. 12 depicts an example of the ANI table. The index is used to enter the fields of the table. The calling party category differentiates among types of calling parties, for example, test calls, emergency calls, and ordinary calls. The calling party\charge number entry nature of address indicates how the ANI is to be obtained. The following is the table fill that is used in this field: unknown, unique subscriber numbers, ANI not available or not provided, unique national number, ANI of the called party included, ANI of the called party not included, ANI of the called party includes national number, non-unique subscriber number, non-unique national number, non-unique international number, test line test code, and all other parameter values.

The "digits from" and "digits to" focus further processing unique to ANI within a given range. The data entry indicates if the ANI represents a data device that does not need echo control. Originating line information (OLI) differentiates among ordinary subscriber, multiparty line, ANI failure, station level rating, special operator handling, automatic identified outward dialing, coin or non-coin call using database access, 800/888 service call, coin, prison/inmate service, intercept (blank, trouble, and regular), operator handled call, outward wide area telecommunications service, telecommunications relay service (TRS), cellular services, private paystation, and access for private virtual network types of service. The next function and next index point to the next table which is typically the called number table.

FIG. 13 depicts an example of a called number screening table. The index is used to enter the table. The nature of address entry indicates the type of dialed number, for example, national versus international. The "digits from" and "digits to" entries focus further processing unique to a range of called numbers. This is where the TCAP response information is incorporated in the call processing flow. This is where the trigger occurs for an LNP TCAP query launch. The processing follows the processing logic of the "digits from" and "digits to" fields in FIG. 11. The next function and next index point to the next table which is typically either the called number table or the LRN table.

FIG. 14 depicts an example of an LRN table. This table will perform the same function as the called number table for those calls that are identified as ported based upon an LNP query response. The index is used to enter the table. The nature of address entry indicates the type of dialed number, for example, national versus international. In an LRN case, the value is a national number. The "digits from" and "digits to" entries focus further processing unique to a range of called numbers. This is where the TCAP response information is incorporated in the call processing flow. The processing follows the processing logic of the "digits from" and "digits to" fields in FIG. 11. The next function and next index point to the next table which is typically the routing table.

FIG. 15 depicts an example of the called number table. The index is used to enter the table. The called number nature of address entry indicates the type of dialed number, for example, national versus international. The "digits from" and "digits to" entries focus further processing unique to a range of called numbers, and they are used in the LRN table check process. The processing follows the processing logic of the "digits from" and "digits to" fields in FIG. 1. The next function and next index point to the next table which is typically the routing table.

FIG. 16 depicts an example of a routing table. The index is used to enter the table. The transit network selection (TNS) network identification (ID) plan indicates the number of digits to use for the CIC. The transit network selection "digits" field defines the numbers to identify an international carrier. The circuit code indicates the need for an operator on the call. The next function, next index, and signal route entries in the routing table are used to identify a trunk group. The second and third next function/index/signal route entries define alternate routes. The third next function entry also can point back to another set of next functions in the routing table in order to expand the number of alternate route choices. The only other entries allowed are pointers to the treatment table. If the routing table points to the trunk group table, then the trunk group table typically points to a trunk circuit in the trunk circuit table. The yield from the trunk circuit table is the terminating connection for the call.

It can be seen from FIGS. 8–16 that the tables can be configured and relate to one another in such a way that call processes can enter the trunk circuit table for the originating connection and can traverse through the tables by keying on information and using pointers. The yield of the tables is typically a terminating connection identified by the trunk circuit table. In some cases, treatment is specified by the treatment table instead of a connection. If, at any point during the processing, a trunk group can be selected, processing may proceed directly to the trunk group table for terminating circuit selection. For example, it may be desirable to route calls from a particular ANI over a particular set of trunk groups. In this case, the ANI table would point directly to the trunk group table, and the trunk group table would point to the trunk circuit table for a terminating circuit. The default path through the tables is: trunk circuit, trunk group, exception, ANI, called number screening, called number, routing, trunk group, and trunk circuit.

FIG. 17 depicts an example of the treatment table. Either the index or the message received cause number are filled and are used to enter the table. If the index is filled and used to enter the table, the general location, coding standard, and cause value indicator are used to generate an SS7 REL. The message received cause value entry is the cause value in a received SS7 message. If the message received cause value is filled and used to enter the table, then the cause value from that message is used in a REL from the call processor. The next function and next index point to the next table.

FIG. 18 depicts an example of the message table. This table allows the call processor to alter information in outgoing messages. Message type is used to enter the table, and it represents the outgoing standard SS7 message type. The parameter is the pertinent parameter within the outgoing SS7 message. The indexes point to various entries in the trunk group table and determine if parameters are passed unchanged, omitted, or modified in the outgoing messages.

It will be appreciated that the system of the present invention advantageously combines flexibility and efficient call processing for call connections in various configurations. In some configurations, processing is allocated to the interworking unit for interworking and/or signal processing, such as echo cancellation, thereby leaving processing capacity available in the ATM switch to complete connections and cross connections for calls. Alternatively, the ATM switch can provide interworking or signal processing for required calls.

The system may control cross connections in the ATM switch in real-time on a call-by-call basis when needed. In addition, calls may be cross connected on provisioned paths through the ATM switch without control from the signaling processor.

This availability of control for the cross connections in the ATM switch allows the system to switch a call from a first interworking unit to a second interworking unit without requiring the call to be sent to a core switch. In addition, because the ATM switch can cross connect calls on a call-by-call basis, the number of interconnections between interworking units is drastically reduced because virtual paths are concentrated and thus do not need provisioning from every interworking unit to every other interworking unit.

In addition, calls can be connected on a call-by-call basis to TDM connections or ATM connections at either the interworking unit or the ATM switch. Moreover, other calls may be connected through permanently provisioned paths without requiring the signaling processor to designate a TDM connection or an ATM connection to connect the call. Thus, the ATM switch and interworking unit combine to provide functions for an ATM and TDM interworking functionality, an ATM to ATM gateway functionality, an ATM and ATM cross connect functionality, and a TDM-ATM-TDM switching funcionality within the interworking system, all of which can be controlled selectively on a real-time call-by-call basis.

Those skilled in the art will appreciate that variations from the specific embodiments disclosed above are contemplated by the invention. The invention should not be restricted to the above embodiments, but should be measured by the following claims.

What is claimed is:

1. A communication system for connecting a call having user communications and call signaling comprising:
   a signaling processor adapted to receive the call signaling, to process the call signaling to select digital signaling requirements and an outgoing connection for the call, and to generate and transmit a first control message identifying the selected digital signaling requirements and a second control message identifying the selected outgoing connection;
   an interworking system adapted to receive the first control message from the signaling processor, to receive the user communications, and to interwork the user communications between a time division multiplex connection and an asynchronous transfer mode connection, and to apply digital signal processing according to the first control message; and
   a first asynchronous transfer mode switch adapted to receive the second control message from the signaling processor, to receive and switch the user communications from the asynchronous transfer mode connection from the interworking system to the outgoing connection.

2. The communication system of claim 1 wherein the digital signal processing comprises echo cancellation.

3. The communication system of claim 2 wherein the outgoing connection comprises an asynchronous transfer mode connection.

4. The communication system of claim 2 wherein the first asynchronous transfer mode switch further is adapted to interwork the user communications between a time division multiplex connection and an asynchronous transfer mode connection provisioned therebetween.

5. The communication system of claim 1 wherein the interworking system comprises:
   an interworking unit adapted to receive the control message from the signaling processor and, in response thereto, to interwork the user communications between a time division multiplex connection and an asynchronous transfer mode connection provisioned therebetween; and
   a second asynchronous transfer mode switch that is not controlled by the signaling processor and which is adapted to receive the user communications from the interworking unit and to switch the user communications onto another provisioned connection.

6. The communication system of claim 5 wherein the interworking unit comprises an echo canceler adapted to cancel echo for the connection.

7. The communication system of claim 5 wherein the second asynchronous transfer mode switch further is adapted to interwork the user communications between a time division multiplex connection and an asynchronous transfer mode connection provisioned therebetween.

8. The communication system of claim 1 wherein the interworking system comprises a service platform adapted to provide enhanced services for the call.

9. The communication system of claim 1 further comprising a voice response unit adapted to provide voice responses to a caller.

10. A system for connecting a call having user communications and call signaling comprising:
    a signaling processor adapted to receive call signaling, to process the call signaling to select a first connection and a second connection for the call, and to transport a first control message identifying the selected first connection and a second control message identifying the selected second connection; and
    an interworking unit adapted to receive the first control message from the signaling processor, to receive the user communications, and to interwork the user communications between a time division multiplex connection and an asynchronous transfer mode connection for the selected first connection according to the first control message; and
    an asynchronous transfer mode switch adapted to receive the second control message from the signaling processor and to switch the user communication to the selected second connection.

11. The system of claim 10 wherein the interworking unit comprises an echo canceler adapted to cancel echo for the connection.

12. The system of claim 10 wherein the asynchronous transfer mode switch further is adapted to interwork the user communications between a time division multiplex connection and an asynchronous transfer mode connection provisioned therebetween.

13. A system for connecting a call having user communications and call signaling comprising:
    a signaling processor adapted to receive call signaling, to process the call signaling to select a connection for the call, and to transport a control message identifying the selected connection;
    an interworking unit adapted to receive the user communications and to interwork the user communications between a time division multiplex connection and an asynchronous transfer mode connection wherein the time division multiplex connection is provisioned prior to the call to be interworked with the asynchronous transfer mode connection; and
    an asynchronous transfer mode switch adapted to receive the control message from the signaling processor and to switch the user communications to the selected connection according to the control message.

14. The system of claim 13 wherein the interworking unit comprises an echo canceler adapted to cancel echo for the connection.

15. The system of claim 13 wherein the asynchronous transfer mode switch further is adapted to interwork the user communications between a time division multiplex connection and an asynchronous transfer mode connection provisioned therebetween.

16. The system of claim 13 wherein the asynchronous transfer mode switch further is adapted to switch other user communications between a first time division multiplex connection and a second time division multiplex connection.

17. The system of claim 13 further comprising a service platform adapted to provide enchanced services for the call.

18. The system of claim 13 further comprising a voice response unit adapted to provide voice responses to a caller for the call.

19. The system of claim 13 further comprising a communication device adapted to transport the user communications to the interworking unit.

20. The system of claim 13 further comprising a communication device adapted to receive the user communications from the asynchronous transfer mode switch.

* * * * *